(12) United States Patent
Zhao et al.

(10) Patent No.: US 10,237,795 B2
(45) Date of Patent: Mar. 19, 2019

(54) EVOLVED PACKET DATA GATEWAY (EPDG) RESELECTION

(71) Applicant: QUALCOMM Incorporated, San Diego, CA (US)

(72) Inventors: Suli Zhao, San Diego, CA (US); Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 15/289,925

(22) Filed: Oct. 10, 2016

(65) Prior Publication Data

US 2017/0105155 A1 Apr. 13, 2017

Related U.S. Application Data

(60) Provisional application No. 62/239,951, filed on Oct. 11, 2015.

(51) Int. Cl.
*H04W 4/00* (2018.01)
*H04W 36/12* (2009.01)
(Continued)

(52) U.S. Cl.
CPC ............ *H04W 36/12* (2013.01); *H04L 45/22* (2013.01); *H04L 45/28* (2013.01);
(Continued)

(58) Field of Classification Search
None
See application file for complete search history.

(56) References Cited

U.S. PATENT DOCUMENTS 8,848,516 B2   9/2014  Sahin et al.
9,235,462 B2   1/2016  Yin et al.
(Continued)

FOREIGN PATENT DOCUMENTS

CN   102781004 A   11/2012
EP     2717626 A2   4/2014
(Continued)

OTHER PUBLICATIONS

Catt, "Network Selection Policy Based on QoS," 3GPP TSG RAN WG2 Meeting #81bis, R2-130969, Chicago, USA, Apr. 15-19, 2013, 2 pgs., XP050699125, 3rd Generation Partnership Project.
(Continued)

*Primary Examiner* — Anh Vu H Ly
(74) *Attorney, Agent, or Firm* — Holland & Hart LLP

(57) ABSTRACT

This disclosure provides systems, methods and apparatus, including computer programs encoded on computer storage media, for wireless communication. A user equipment (UE) device may be connected to a first evolved packet data gateway (ePDG) via a first radio access technology (RAT). The UE may evaluate, either periodically or based on a trigger event, an ePDG reselection metric associated with the first ePDG to determine whether selecting a second ePDG different from the first ePDG is viable. The UE may then reselect to a second ePDG based on whether the ePDG reselection metric satisfies one or more selection conditions. Selection conditions may include, for example, a change in the location or public land mobile network (PLMN) of the UE, UE movement between networks, or a connection failure associated with the first ePDG.

19 Claims, 16 Drawing Sheets

(51) Int. Cl.
  *H04L 12/707* (2013.01)
  *H04L 12/703* (2013.01)
  *H04L 29/12* (2006.01)
  *H04W 84/04* (2009.01)
  *H04W 88/16* (2009.01)
  *H04W 36/36* (2009.01)

(52) U.S. Cl.
  CPC ......... *H04L 61/1511* (2013.01); *H04W 36/36* (2013.01); *H04W 84/042* (2013.01); *H04W 88/16* (2013.01)

(56) References Cited

U.S. PATENT DOCUMENTS

| | | | | |
|---|---|---|---|---|
| 2011/0268086 A1* | 11/2011 | Liang | | H04W 36/0055 370/331 |
| 2011/0286410 A1* | 11/2011 | Zembutsu | | H04W 36/00 370/329 |
| 2012/0322412 A1 | 12/2012 | Qiang | | |
| 2013/0290722 A1* | 10/2013 | Kall | | H04L 12/4633 713/171 |
| 2014/0146783 A1* | 5/2014 | Kim | | H04W 76/021 370/329 |
| 2014/0153559 A1* | 6/2014 | Roeland | | H04L 61/304 370/338 |
| 2015/0063249 A1* | 3/2015 | Jover Segura | | H04W 36/12 370/329 |
| 2015/0304908 A1* | 10/2015 | Yu | | H04W 48/17 370/331 |
| 2015/0350983 A1 | 12/2015 | Kwok et al. | | |
| 2015/0373770 A1* | 12/2015 | Niemi | | H04W 76/18 370/329 |
| 2016/0037328 A1* | 2/2016 | Raveendran | | H04W 8/08 370/328 |
| 2016/0295476 A1* | 10/2016 | Bi | | H04W 36/12 370/329 |
| 2016/0337310 A1* | 11/2016 | Faccin | | H04W 4/90 370/328 |
| 2016/0337942 A1* | 11/2016 | Catovic | | H04W 48/08 370/328 |
| 2016/0345256 A1* | 11/2016 | Niranjan | | H04W 48/20 370/328 |
| 2017/0005914 A1* | 1/2017 | Edge | | H04W 4/90 370/328 |
| 2017/0094512 A1* | 3/2017 | Kiss | | H04L 63/0853 370/328 |
| 2017/0251416 A1* | 8/2017 | Drevon | | H04W 36/12 370/328 |
| 2018/0091967 A1* | 3/2018 | Gupta | | H04W 8/02 370/328 |
| 2018/0139692 A1* | 5/2018 | Liu | | H04W 48/18 370/328 |

FOREIGN PATENT DOCUMENTS

| WO | WO2012146096 A1 | 11/2012 |
|---|---|---|
| WO | WO2013037273 A1 | 3/2013 |
| WO | WO-2015003125 A2 | 1/2015 |

OTHER PUBLICATIONS

ISA/EP, International Search Report and Written Opinion of the International Searching Authority, Int'l Application No. PCT/US2016/056393, Jan. 2, 2017, European Patent Office, Rijswijk, NL, 14 pgs.

* cited by examiner

EVOLVED PACKET DATA GATEWAY (EPDG) RESELECTION

CROSS-REFERENCE TO RELATED APPLICATIONS

The present application for patent claims priority to U.S. Provisional Patent Application No. 62/239,951 by Zhao, et al., entitled "EVOLVED PACKET DATA GATEWAY RESELECTION," filed Oct. 15, 2015, assigned to the assignee hereof.

TECHNICAL FIELD

This disclosure relates to wireless communication, and more specifically to evolved packet data gateway (ePDG) reselection.

DESCRIPTION OF THE RELATED TECHNOLOGY

Wireless communications systems are widely deployed to provide various types of communication content such as voice, video, packet data, messaging, broadcast, and so on. These systems may be multiple-access systems capable of supporting communication with multiple users by sharing the available system resources (such as time, frequency, and power). A wireless network, such as a wireless local area network (WLAN) (i.e., IEEE 802.11), or another network operating in an unlicensed radio frequency spectrum such as MulteFire (such as operating based on the Long Term Evolution (LTE) technology in an unlicensed spectrum) may include an access point (AP) or base station that may communicate with stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

Other examples of multiple-access wireless communication systems may include communications using wireless wide area network (WWAN) techniques (such as cellular communication techniques such as LTE technology). For example, a STA also may be referred to a user equipment (UE) configured for communications using code-division multiple access (CDMA) systems, time-division multiple access (TDMA) systems, frequency-division multiple access (FDMA) systems, and orthogonal frequency-division multiple access (OFDMA) systems. Such wireless multiple-access communication system may include a number of base stations, each simultaneously supporting communication for multiple communication devices, such as user equipment (UEs). A base station may communicate with UEs on downlink channels (such as transmissions from a base station to a UE) and uplink channels (such as transmissions from a UE to a base station).

User demand for constant access and consistent quality of service by UEs configured for WWAN communications has strained the WWAN infrastructure. Moreover, the cost structure related to the use of WWAN services is different from the cost structure of using other wireless networks such as WLAN or MulteFire, and in some cases it is desirable to send and receive data over the WLAN or MulteFire accesses instead of the WWAN access. In addition, certain services provided by a WWAN infrastructure are available only when the UE is connected securely to the WWAN evolved packet core (EPC). To address these, UEs are sometimes configured to offload certain WWAN communications and traffic via WLAN systems or other wireless networks that do not belong to the WWAN system. In some instances, these systems may be considered untrusted. In some implementations, the UE may roam between trusted networks and untrusted networks, such as between trusted WWAN systems and untrusted WLAN systems. An evolved packet data gateway (ePDG) in the WWAN core network (CN) generally provides a link for a UE in an untrusted network to allow for integration of access of traffic that is not transported over a WWAN wireless access into the WWAN EPC, for example, provides security and access control framework functions that allow a UE (or STA) to meet 3rd generation partnership project (3GPP) security standards to access the WWAN EPC.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. In some implementations, the method can include connecting, by a user equipment (UE), to a first evolved packet data gateway (ePDG) via a first radio access technology (RAT), evaluating, by the UE, an ePDG reselection metric associated with the first ePDG, and reselecting, by the UE, a second ePDG based at least in part on the ePDG reselection metric satisfying one or more selection conditions.

Another innovative aspect of the subject matter described in this disclosure can be implemented in an apparatus for wireless communication. The apparatus can be in a system including a processor, memory in electronic communication with the processor, and instructions stored in the memory and operable, when executed by the processor, to connect, by a UE, to a first ePDG via a first RAT, evaluate, by the UE, an ePDG reselection metric associated with the first ePDG, and reselect, by the UE, a second ePDG based at least in part on the ePDG reselection metric satisfying one or more selection conditions.

Another innovative aspect of the subject matter described in this disclosure can be implemented in a non-transitory computer-readable medium storing code for wireless communication. The code can include instructions executable by a processor to connect, by a UE, to a first ePDG via a first RAT, evaluate, by the UE, an ePDG reselection metric associated with the first ePDG, and reselect, by the UE, a second ePDG based at least in part on the ePDG reselection metric satisfying one or more selection conditions.

In some implementations, the method, apparatus, or computer-readable medium can include identifying a connection failure status associated with a packet data network (PDN) gateway and determining that at least a portion of ePDGs associated with a first public land mobile network (PLMN) are blocked, or that connection attempts to ePDGs of the first PLMN that are not blocked have failed, or combinations of both, where the second ePDG can be associated with a second PLMN. The method, apparatus, or computer-readable medium can include determining that the at least portion of ePDGs associated with a first PLMN becomes un-blocked and evaluating the ePDG reselection metric base at least in part on the portion of the ePDGs being unblocked.

In some implementations, the method, apparatus, or computer-readable medium can include identifying at least one condition parameter associated with the ePDG reselection evaluation, determining that the at least one condition parameter is unsatisfied, and refraining from evaluating the ePDG reselection metric while the at least one condition parameter is unsatisfied. The at least one condition parameter can include a change of a PLMN of a cellular RAT, or a PDN connection status failure via the first ePDG, or combinations thereof. In some implementations, the method, apparatus, or computer-readable medium can include determining that the at least one condition parameter is satisfied, identifying an inactive operational status of the UE, identifying a change in the ePDG reselection metric, and performing a domain name system (DNS) query based on at least one of the changed ePDG reselection metric or an ePDG fully qualified domain name (FQDN) configured at the UE, where reselecting the second ePDG is further based on an identifier associated with the first ePDG being absent from a results of the DNS query.

In some implementations, the method, apparatus, or computer-readable medium can include releasing a connection to a PDN via the first ePDG, the releasing based at least in part on the PDN being associated with a non-roaming access list. The first ePDG may be associated with a first PLMN and the second ePDG may be associated with a second PLMN. The method, apparatus, or computer-readable medium can include identifying an active operational status of the UE and refraining from reselecting the second ePDG based at least in part on the operational status. The active operational status can be associated with a restricted service associated with UE communications. The active operational status can be associated with an application operating on the UE.

In some implementations, the ePDG reselection metric can be associated with at least one of current PLMN detected by the UE, or a current geographical location of the UE, or a current cell identity detected by the UE, or combinations thereof. In some implementations, the method, apparatus, or computer-readable medium can include evaluating the ePDG reselection metric according to a periodic schedule. In some implementations, the method, apparatus, or computer-readable medium can include evaluating the ePDG reselection metric based at least in part on a triggering event.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

DETAILED DESCRIPTION

Figure 1:
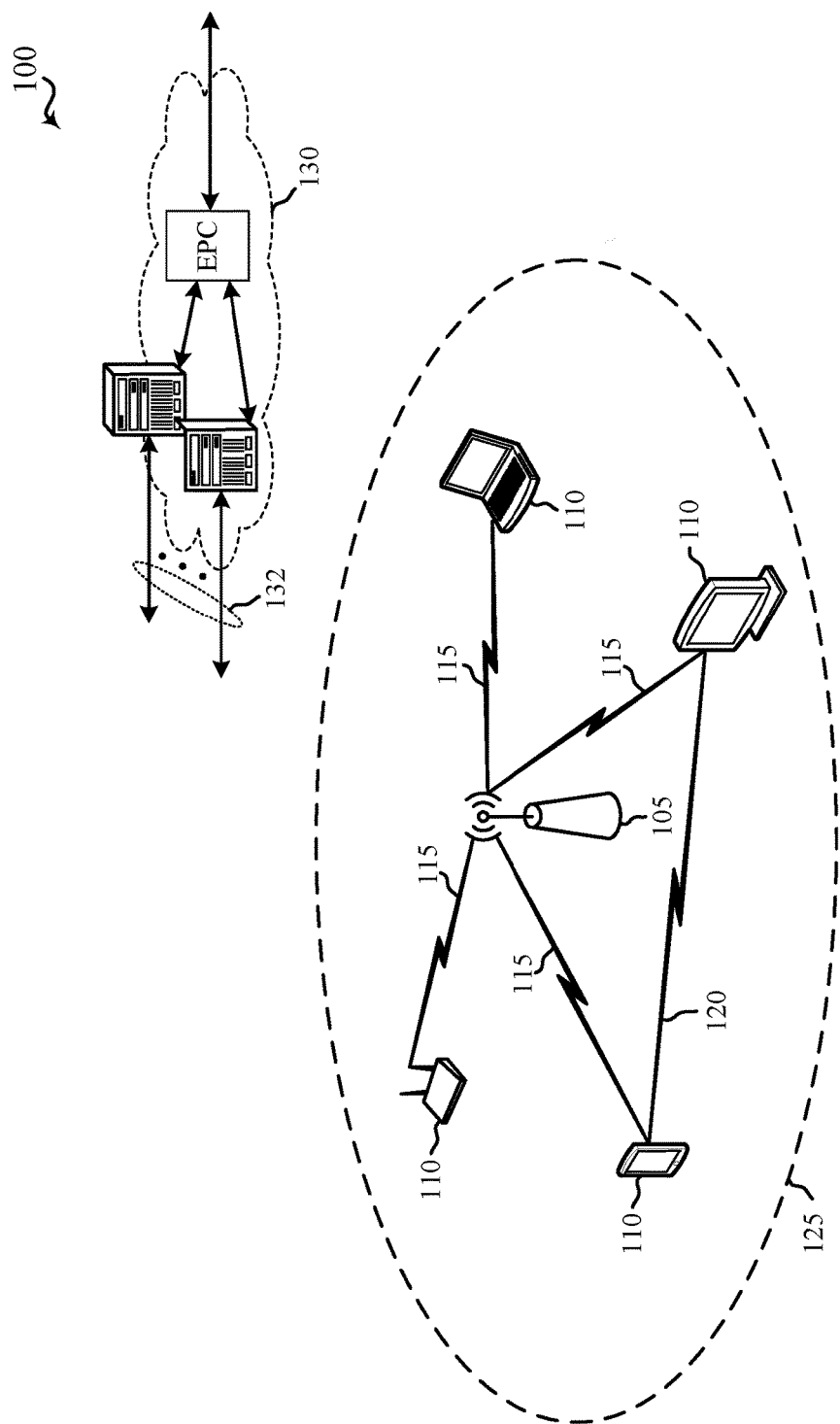
FIG. 1 shows a schematic diagram of an example system for wireless communications.

The following description is directed to certain implementations for the purposes of describing the innovative aspects of this disclosure. However, a person/one having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A user equipment (UE) (or station (STA), as the terms are interchangeable) may connect to a first evolved packet data gateway (ePDG), which provides secure access and connectivity for the UE to a wireless wide area network (WWAN) evolved packet core (EPC). The WWAN EPC may provide voice and data services to the UE. The UE can evaluate whether a selection to a current ePDG is viable and, if not, determine whether selection to a different ePDG is warranted based on one or more ePDG reselection metrics associated with the first ePDG.

In some implementations, the UE may be communicating in an untrusted network and connected to the first ePDG via a wireless communication system. As one example, the UE may be connected to the first ePDG via an untrusted WLAN or MulteFire radio access technology (RAT) through an AP. The UE may evaluate an ePDG reselection metric associated with the first ePDG either periodically or based on a trigger event. Based on the evaluation, the UE may reselect to the second ePDG. For example, the UE may reselect to the second ePDG when the ePDG reselection metric of the first ePDG satisfies selection condition(s). Examples of selection conditions include, but are not limited to, a change in the location or public land mobile network (PLMN) of the UE, a movement of the UE between different WLAN or MulteFire networks, a movement of the UE between a WLAN and a MulteFire network, or a connection failure in which the UE has successfully selected the first ePDG but is unable to connect to a packet data network (PDN) via the first ePDG. Thus, the described techniques provide a mechanism for a UE to reselect to the second ePDG when appropriate to ensure access to the EPC.

Particular implementations of the subject matter described in this disclosure can be implemented to realize one or more of the following potential advantages. By reselecting to a second ePDG, a UE can maintain a more consistent connection to the EPC, thereby improving voice and data throughput for the UE when a failure or loss of service occurs at the first ePDG. Additionally, UE mobility may be enhanced by allowing the UE to connect to a second ePDG which allows roaming if the UE is currently connected to a first ePDG which does not allow roaming. Furthermore, if the UE determines that an ePDG associated with a higher quality PLMN becomes un-blocked, the UE may opt to reselect to the ePDG associated with the higher quality PLMN. Choosing an ePDG associated with a higher quality PLMN may also improve voice and data throughput.

FIG. 1 illustrates an example of a system for wireless communication such as a wireless network 100 (such as a WLAN or a Wi-Fi network). The WLAN 100 may include an AP 105 and multiple associated UEs 110, which may represent devices such as wireless stations, mobile stations, personal digital assistant (PDAs), other handheld devices, netbooks, notebook computers, tablet computers, laptops, display devices (such as TVs, computer monitors, etc.), printers, etc. When wireless network 100 is configured as a MulteFire network, the AP 105 may be configured as a MulteFire evolved Node B (eNB) or base station. The various UEs 110 in the network are able to communicate with one another through the AP 105. Also shown is a coverage area 125 of the AP 105. The wireless network 100 may generally be considered a non-3GPP network. In some aspects, the wireless network 100 may be an untrusted network from the perspective of a UE 110. For example, the UE 110 may not otherwise be configured in a subscriber group of the wireless network 100.

Although not shown in FIG. 1, a UE 110 may be located in the intersection of more than one coverage area 125 and may associate with more than one AP 105. UEs 110 and APs 105 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, etc. UEs 110 and APs 105 may communicate according to other RATs, such as MulteFire, a free standing LTE-based technology that operates in an unlicensed radio frequency spectrum.

A UE 110 may access a core network 130 via the wireless network 100 using links 132. For example, the wireless network 100 may be an untrusted, non-3GPP network from the perspective of the UE 110. The UE 110 may establish a data connection in an EPC of the core network 130. An access point name (APN) may be the name of a gateway between a wireless network and another computer network (such as the Internet). A UE 110 making a data connection (as opposed to, such as a circuit switched voice connection) may be configured with an APN, which it conveys upon accessing the network. A server of the core network 130 may then examine the APN to determine what type of network connection may be created (such as what IP or IP multimedia subsystem (IMS) address may be assigned or what security methods may be used). In other words, the APN may identify the packet data network (PDN) that a UE 110 wants to communicate with. In addition to identifying a PDN, an APN also may be used to define a service type (such as a wireless application protocol (WAP) server or multimedia messaging service (MMS)) that is provided by the PDN.

In a conventional cellular wireless communication system, the core network 130 may be an EPC, which may include at least one mobility management entity (MME), at least one serving gateway (S-GW), and at least one packet data network gateway (P-GW). The MME may be the control node that processes the signaling between the UE 110 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an MS, and a Packet-Switched (PS) Streaming Service (PSS).

A WWAN configured UE 110 may attach to a PLMN by identifying a set of available PLMNs, selecting the highest priority PLMN (such as the home PLMN), and then selecting the best available cell in the selected PLMN. If the UE 110 performs a cell search while connected to a visitor PLMN (VPLMN), it may use the priority offset to give preference to a home PLMN (or another higher priority PLMN).

The UE 110 may be configured for ePDG reselection in some examples. For example, the UE 110 may be connected to an ePDG (a first ePDG) via a first RAT, for example via wireless network 100, which may be an untrusted WLAN, a MulteFire network, or another non-3GPP network. The UE 110 may be connected to PDN via the ePDG in either a home routed configuration or a local breakout configuration. The UE 110 may evaluate an ePDG reselection metric associated with the connected ePDG according to a periodic schedule, a triggering event, or both. In the instances where the ePDG reselection metric satisfies a selection condition(s), the UE 110 may reselect to a different ePDG (a second ePDG). For example, the UE 110 may reselect to the different ePDG when the UE 110 moves (for example, to a different geographic location or moves and attaches to a different PLMN or moves between different wireless networks 100). In another example, the UE 110 may reselect to the different ePDG when the UE 110 detects certain connection failures via the currently connected ePDG.

In some aspects, the UE 110 may not evaluate the ePDG reselection metric or reselect to the different ePDG under certain operations configurations or conditions. For example, the UE 110 may refrain from evaluating the ePDG reselection metric when certain conditions are unsatisfied, when the UE 110 is communicating certain restricted services, such as certain traffic types or real time services, etc. Alternative examples include the UE 110 evaluating the ePDG reselection metric based on detecting a change in the ePDG reselection metric, such as the UE 110 being configured for other or additional ePDGs, etc. Accordingly, the UE 110 may detach from its current ePDG and reselect to a different ePDG based on the ePDG reselection metric.

Figure 2:
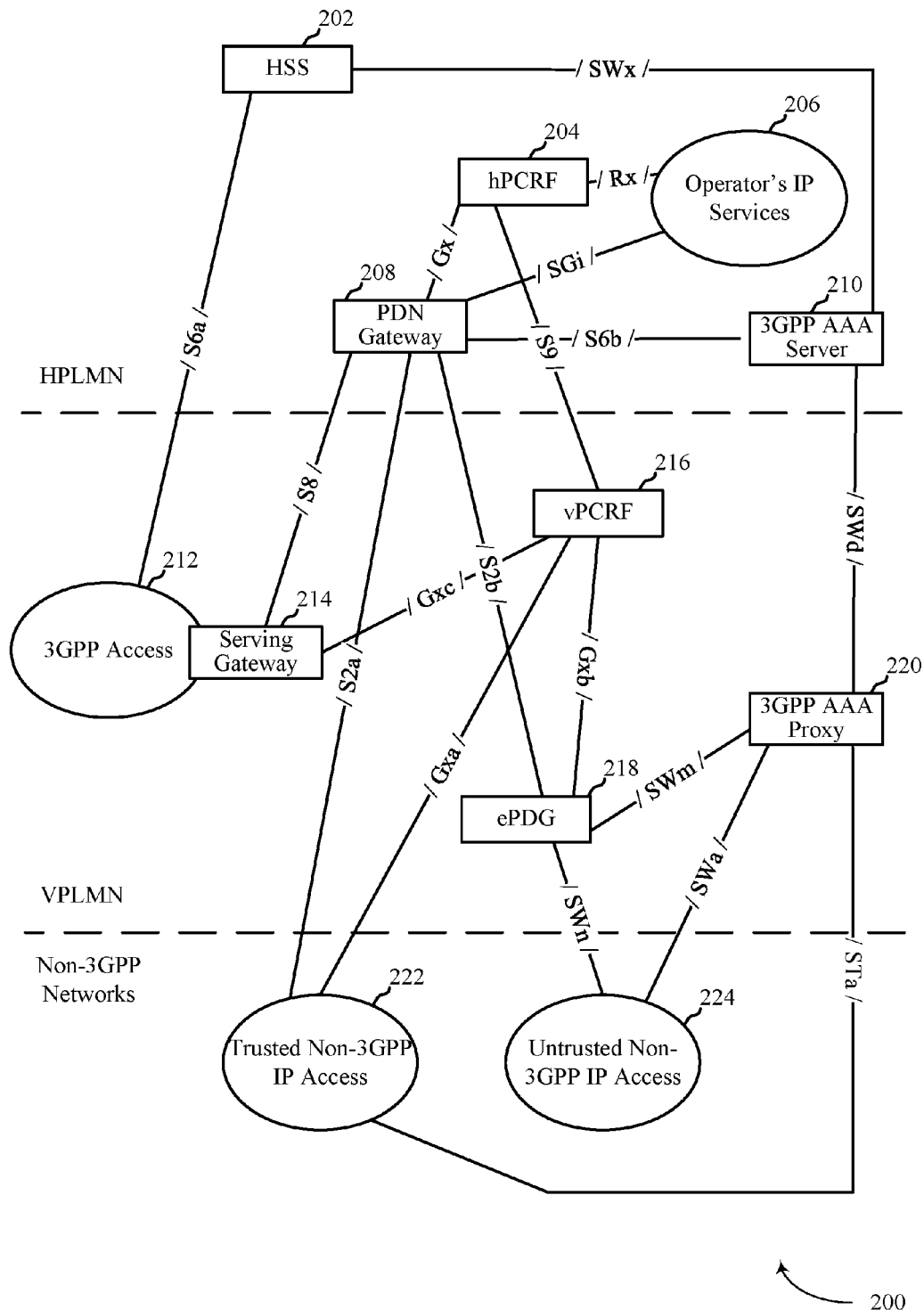
FIG. 2 shows a schematic diagram of an example system for wireless communications.

FIG. 2 illustrates an example of a system for wireless communication such as a WLAN 200 for ePDG reselection. Generally, the WLAN 200 may be an example of a roaming architecture for an evolved packet system (EPS), for example an EPC as is described with reference to FIG. 1. The WLAN 200 may illustrate an example of a home routed configuration using S8, such as S2a-S2b. The WLAN 200 may illustrates examples of a HPLMN, a VPLMN, or a non-3GPP network. The non-3GPP network may be an example of and implement aspects of the wireless network 100 described with reference to FIG. 1.

Generally, the HPLMN may refer to an operator configured as a home operator or service provider for a UE 110. The VPLMN may refer to a visiting operator or service provider that the UE 110 is attached to or otherwise in communication with. The HPLMN and VPLMN may generally be considered 3GPP networks, or other packet-switched cellular wireless communications systems. When the UE 110 is remote from its HPLMN, it may access various services of the HPLMN via the VPLMN.

The HPLMN may include a home subscriber server (HSS) 202, a home policy and charging rules function (hPCRF) 204, an operator IP services 206, a PDN gateway 208, and a 3GPP authentication, authorization, and accounting (AAA) server 210. The illustrated components of the HPLMN may implement at least a portion of the functionality of a core network for the HPLMN, although the core network may include additional or different components. The HSS 202 generally provides or includes subscription data related to the use of and provided by the HPLMN, such as IMS services. The hPCRF 204 may interface with the main packet gateway of the HPLMN and provide charging to UEs based on their volume of usage of data, based on the demanded quality of service guaranteed, etc. The operator IP services 206 generally provides IP based access to various networks, such as the Internet. The PDN gateway 208 generally allocates dynamic IP addresses and routes user plane packets, policy, quality of service (QoS) control, etc., for the HPLMN. The 3GPP AAA server 210 generally provides authorization, policy enforcement and routing information, and charging services, etc., for the HPLMN.

Similarly, the VPLMN may include a 3GPP access 212, a serving gateway 214, visiting policy and charging rules function (vPCRF) 216, an ePDG 218, and a 3GPP AAA proxy server 220. The illustrated components of the VPLMN may implement at least a portion of the functionality of a core network for the VPLMN, although the core network may include additional or different components. The 3GPP access 212 may include conventional cellular access infrastructure, such as a base station or cell serving UEs within a respective coverage area. The serving gateway 214 generally routes and forwards user data packets and acts as the mobility anchor for the user plane during internetwork handovers by a UE 110. The vPCRF 216 provides charging to UEs 110, similar to the hPCRF 204. The 3GPP AAA proxy server 220 provides similar functions for the VPLMN as the 3GPP AAA server 210 provides for the HPLMN.

The non-3GPP network may be any network implementing communications protocols other than 3GPP protocols. In some examples, the non-3GPP network may include a WLAN implementing a RAT associated with WLAN communications. Other RATs also may constitute a non-3GPP network, such as a MulteFire RAT. Generally, the non-3GPP network may include trusted non-3GPP IP access 222 or untrusted non-3GPP IP access 224. One non-limiting example of untrusted non-3GPP IP access may include a UE 110 connected to an AP of a WLAN.

The ePDG 218 generally provides untrusted non-3GPP access to the EPC, such as the HPLMN or VPLMN. The PDN connectivity service may be provided by IPsec connectivity between the UE 110 connected to the non-3GPP network (such as a WLAN) and the ePDG 218 concatenated with bearer(s) for GTP-based S2b. On the S2b interface, a bearer may uniquely identify traffic flows that receive a common QoS treatment between the ePDG and the PDN gateway.

Initially, a UE 110 is connected to ePDG 218 based on information received by its respective HPLMN. The UE 110 may connect to ePDG 218 based on the PLMN that it is currently attached to, for example due to UE mobility. A UE 110 connecting to an ePDG, such as ePDG 218, may generally follow protocols outlined in 3GPP technical specification (TS) 23.402. For example, the UE 110 may construct a FQDN for configured ePDGs based on a PLMN identifier, based on a tracking area/location area identity, etc. When configured by the HPLMN, the HPLMN may provide to the UE a FQDN or IP address of an ePDG of the HPLMN, a list of PLMNs and, for each PLMN, an indication of whether selection of an ePDG in the PLMN may be beneficial or mandatory. Broadly, the UE 110 may use the information associated with the ePDG to construct the FQDN and perform a DNS query to determine the IP address of the selected ePDG. The UE 110 may then connect to the ePDG at its respective IP address. In the example wireless communications system 200, the UE 110 is home routed and connects to the PDN gateway 208 of the HPLMN through the ePDG 218 of the VPLMN. Current implementations, however, do not provide a mechanism for a UE 110 to reselect to a different ePDG from the currently selected ePDG.

A UE 110 configured in accordance with aspects of the present disclosure may evaluate an ePDG reselection metric and, in some circumstances, reselect to a different ePDG. The UE 110 may be connected to an ePDG, such as ePDG 218, via a non-3GPP RAT such as a WLAN RAT. The UE 110 may, periodically or based on a triggering event, evaluate the ePDG reselection metric associated with the connected ePDG. When the ePDG reselection metric satisfies selection condition(s), the UE 110 may reselect to the different ePDG.

In some aspects, after selecting a first ePDG, the UE 110 may periodically re-evaluate the ePDG selection conditions (such as the ePDG reselection metric that is based on at least one of a currently detected PLMN, a current UE geographical location, current cell identity, etc.) to determine whether discovery and selection of a different ePDG is appropriate. For example, the ePDG reselection metric may be based on the geographic location of the UE 110. The ePDG reselection metric may satisfy a selection condition based on the UE 110 moving a configured distance from the ePDG or from a previous location. As another example, the ePDG reselection metric may satisfy a selection condition when the UE 110 detects that it has moved into or otherwise detects a different PLMN, such as a VPLMN. Yet another example may include the ePDG reselection metric satisfying a selection condition when the UE 110 detects that the current cell identifier (ID) has changed.

In some aspects, the UE 110 may be configured with a list (such as an ePDG reselection evaluation condition list or EPDGReselEvlCondList). The UE 110 may utilize the list for periodic re-evaluation of the ePDG reselection metric on a conditional basis or an unconditional basis. For example, when the list contains a condition that is satisfied, the UE 110 may continue to re-evaluate the ePDG reselection metric. Examples of conditions in the ePDG reselection evaluation condition list may include when the UE 110 detects that it has changed PLMN over 3GPP access, when the UE 110 fails in connecting to a given APN over the currently connected ePDG, etc.

For example, the UE 110 may use the ePDG reselection evaluation condition list to identify a condition parameter associated with the ePDG reselection evaluation. If a condition, or multiple conditions are unsatisfied, the UE 110 may refrain from evaluating the ePDG reselection metric while the condition(s) are unsatisfied.

In some aspects, the UE 110 may determine or otherwise detect a change of the ePDG selection conditions. Based on the detected change, the UE 110 may determine whether reselection to a different ePDG may be appropriate. For example, the change of the ePDG selection conditions may include the UE 110 being configured with additional or different ePDGs. The UE 110 may perform a DNS query using the changed ePDG selection conditions. The DNS query may be performed prior to the UE 110 proceeding with PDN connection procedures. In an example where the currently selected ePDG is not listed in the DNS query results list, the UE 110 may reselect to a different ePDG.

In some aspects, the UE 110 may be configured by the HPLMN with a list of non-roaming APNs, such as a NoRoamingAPNList. The list may identify APN(s) that may be released when the UE 110 determines to reselect from a HPLMN ePDG to a VPLMN ePDG. The HPLMN may include in the list the APN(s) that use local breakout configurations while the UE 110 is roaming, such as described with reference to FIG. 3. When the UE 110 determines that a different ePDG may be selected, if the PLMN change is between HPLMN to VPLMN, the UE 110 may release the existing PDN connection on the source ePDG if the corresponding APN is included in the non-roaming APN list.

In some aspects, the UE 110 may be configured by the HPLMN with a list, such as a ForbiddenEPDGReselection-Traffic list, of forbidden ePDG reselection traffic types, APNs, or applications for which ePDG reselection may not be performed when such traffic type is active. The UE 110 may refrain from the ePDG reselection procedure when the UE 110 is involved with real time services ongoing over the ePDG.

For example, the UE 110 may identify an operational status of the UE 110, such as an active operational status or an inactive operational status. An active operational status may include instances where the UE 110 is communicating via a forbidden traffic type, the UE 110 is communicating via an APN included in the forbidden list, has ongoing real time services, etc. Conversely, an inactive operational status may include instances where the UE 110 is not communicating via a forbidden traffic type, the UE 110 is not communicating via an APN included in the forbidden list, has no ongoing real time services, etc. The UE 110 may refrain from performing the ePDG reselection evaluation when in an active operational status.

In some aspects, the UE 110 may, after selecting an ePDG in a PLMN (such as a VPLMN), encounter or otherwise detect certain failures. The failure(s) the UE 110 may detect may be configurable and may include a network reject indicating that the UE 110 may not retry a connection on the selected ePDG in the current PLMN. The detected failure may occur when the UE 110 is attempting to establish a PDN connection via the selected ePDG. If authorized by the current PLMN or the HPLMN, the UE 110 may reselect to an ePDG of the HPLMN. In some examples, reselection to the ePDG of the HPLMN may occur without ePDG selection conditions being satisfied (for example without detecting a PLMN change by the UE 110).

For example, the UE 110 may determine that a connection attempt to a PDN gateway has failed. The UE 110 may determine whether all or some of the ePDGs associated with the current PLMN are blocked. The UE 110 also may determine that attempts to connect to un-blocked ePDG(s) of the current PLMN have failed. Accordingly, the UE 110 may reselect to a different ePDG of a different PLMN. The UE 110 may determine that one, some, or all of the previously ePDGs of the current PLMN have become un-blocked. Accordingly, the UE 110 may re-evaluate the ePDG reselection metric based on the ePDG(s) becoming un-blocked.

Figure 3:
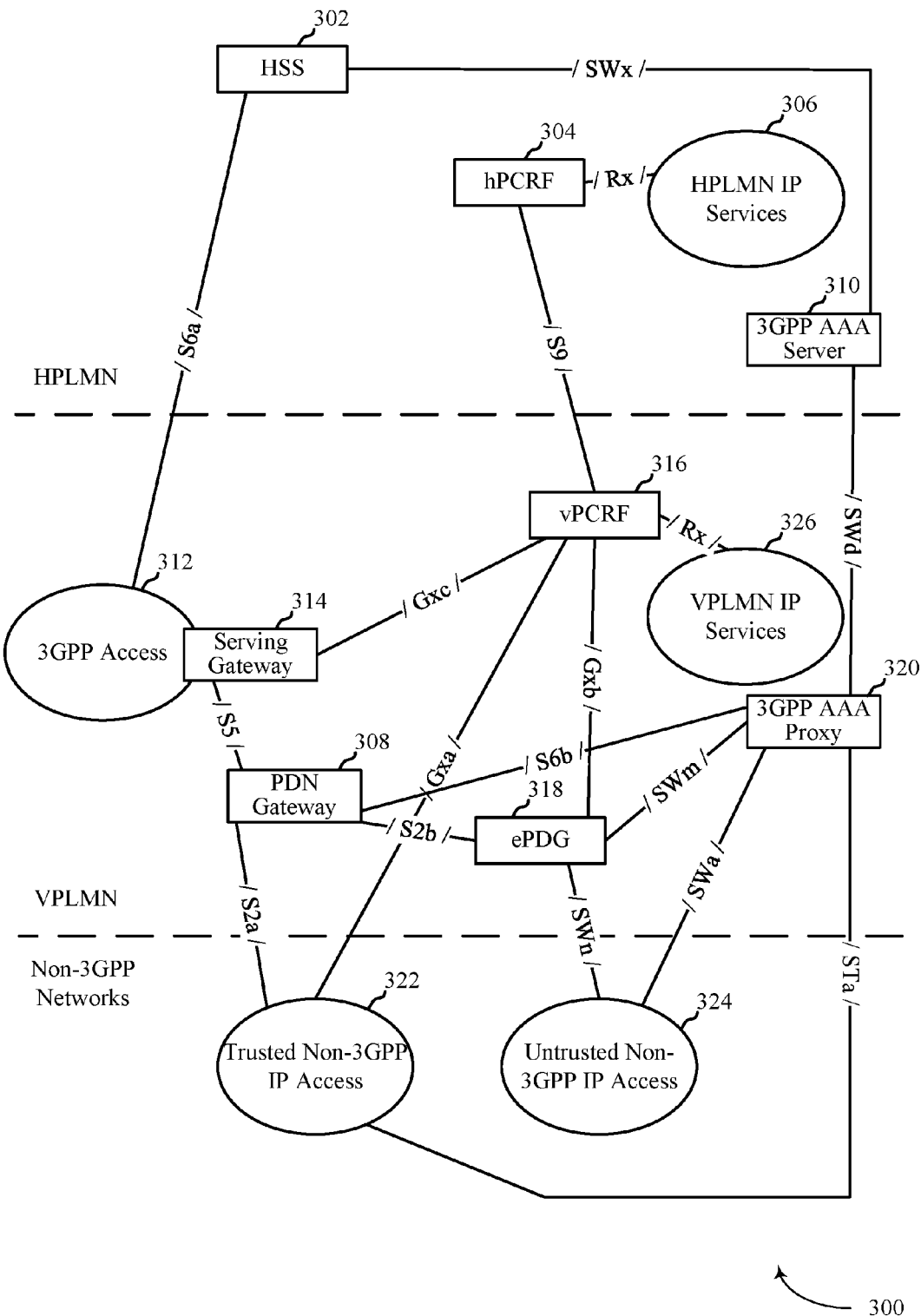
FIG. 3 shows a schematic diagram of an example system for wireless communications.

FIG. 3 illustrates an example of a system for wireless communication such as a WLAN 300 for ePDG reselection. Generally, the WLAN 300 may be an example of a roaming architecture for an EPS, for example an EPC such as is described with reference to FIG. 1. In some aspects, the WLAN 300 may illustrate an example of a local breakout configuration using S5, S2a, S2b. The WLAN 300 may illustrates examples of a HPLMN, a VPLMN, and a non-3GPP network. The non-3GPP network may be an example of and implement aspects of the WLAN 100 described with reference to FIG. 1. The WLAN 300 may implement aspects or functionality of the WLAN 200 described with reference to FIG. 2.

Generally, the HPLMN may refer to an operator configured as a home operator or as a service provider for a UE 110. The VPLMN may refer to a visiting operator or service provider that the UE 110 is attached to or otherwise in communication with. The HPLMN and VPLMN may generally be considered 3GPP networks, or other packet-switched cellular wireless communications systems. When the UE 110 is remote from its HPLMN, for example roaming, it may access various services of the HPLMN via the VPLMN.

The HPLMN may include a HSS 302, an hPCRF 304, an HPLMN IP services 306, and a 3GPP AAA server 310, which may perform the functions of the HSS 202, hPCRF 204, and operator IP services 206, and 3GPP AAA server 210, respectively, described with respect to FIG. 2. The illustrated components of the HPLMN may implement at least a portion of the functionality of a core network for the HPLMN, although the core network may include additional or different components.

Similarly, the VPLMN may include a 3GPP access 312, a serving gateway 314, vPCRF 316, an ePDG 318, and a 3GPP AAA proxy server 320. The 3GPP access 312, a serving gateway 314, vPCRF 316, ePDG 318, and 3GPP AAA proxy server 320, may perform the functions of the 3GPP access 212, the serving gateway 214, the vPCRF 216, the ePDG 218, and the 3GPP AAA proxy server 220, respectively, described with reference to FIG. 2. The illustrated components of the VPLMN may implement at least a portion of the functionality of a core network for the VPLMN, although the core network may include additional or different components. The VPLMN also may include a PDN gateway 308, which may perform, for the VPLMN, the functions of the PDN gateway 208 described with reference to FIG. 2.

The non-3GPP network may be any network implementing communications protocols other than 3GPP protocols. In some examples, the non-3GPP network may include a WLAN implementing a RAT associated with WLAN communications. Other RATs also may constitute a non-3GPP network. Generally, the non-3GPP network may include trusted non-3GPP IP access 322 or untrusted non-3GPP IP access 324. One non-limiting example of untrusted non-3GPP IP access 324 may include a UE 110 connected to an AP of the WLAN 300.

Generally in the local breakout configuration illustrated in wireless communications system 300, the UE 110 connecting to the ePDG 318 via the untrusted non-3GPP IP access 324 may connect to the PDN gateway 308 of the VPLMN rather than the PDN gateway 208 of the UE's HPLMN. The UE 110 may be configured for ePDG re-evaluation and reselection in accordance with the features described with reference to FIG. 2. For example, the UE 110 may evaluate the ePDG reselection metric associated with the current ePDG and reselect to a different ePDG when the ePDG reselection metric satisfies a selection condition.

Figure 4A:
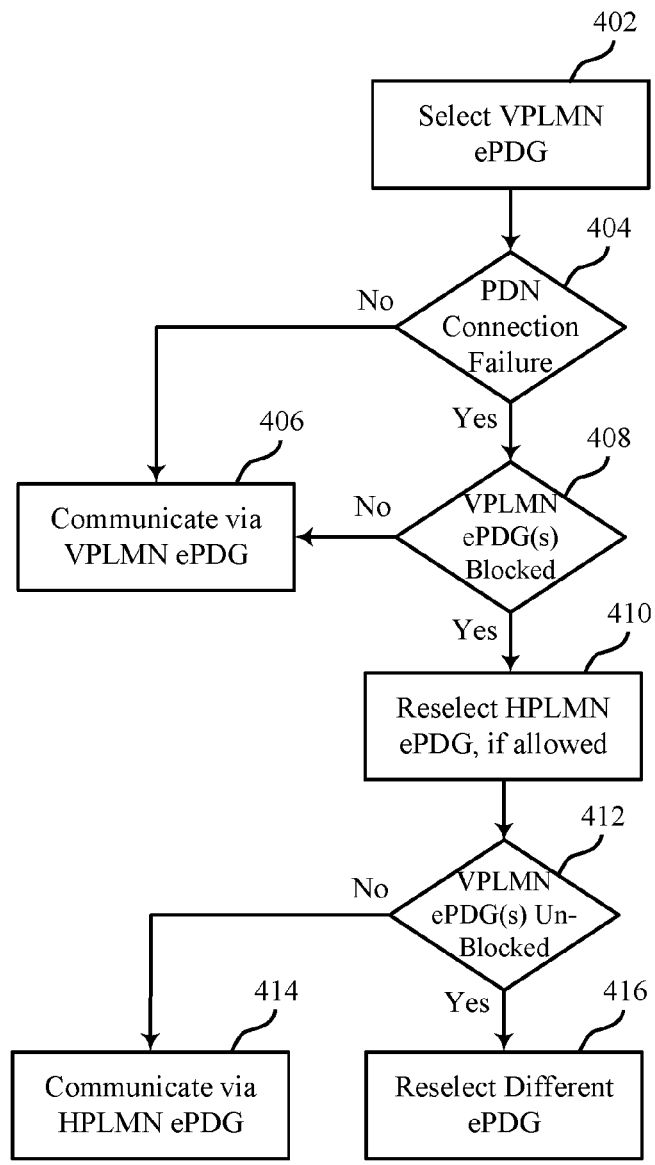
FIGS. 4A-4C show example flowcharts for evolved packet data gateway (ePDG) reselection.
Figure 4B:
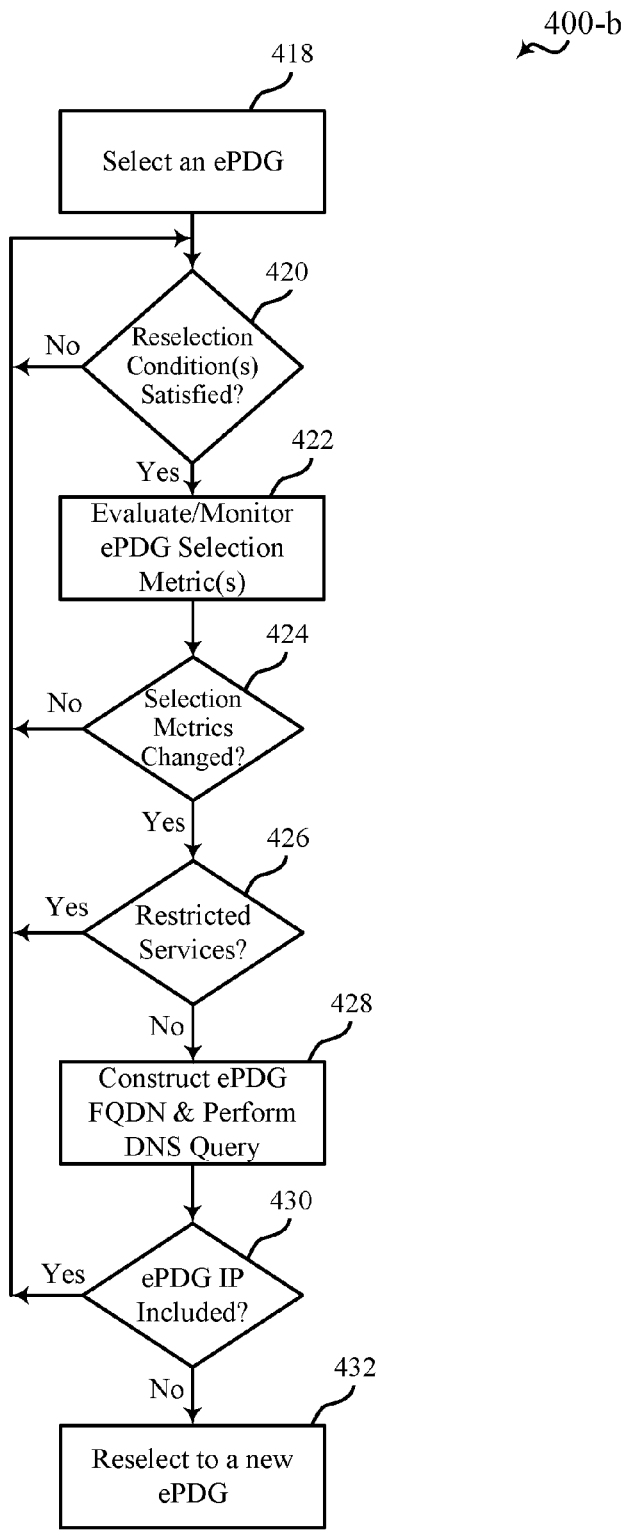
Figure 4C:
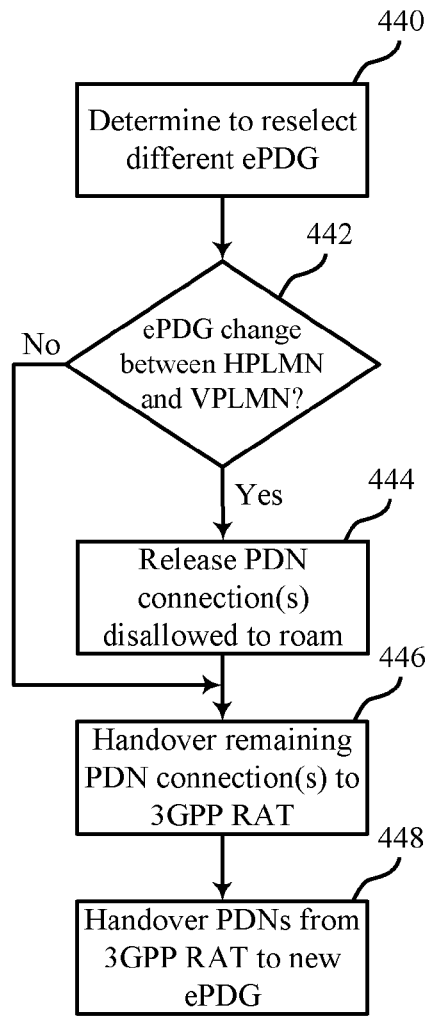

FIGS. 4A-4C illustrate examples of a method 400 for ePDG reselection. In some cases, method 400 may represent aspects of techniques performed by a UE 110 as described with reference to FIGS. 1-3. For example, the UE 110 may implement block(s) of the method 400 for evaluating an ePDG reselection metric associated with a currently selected ePDG and reselecting to a different ePDG when the ePDG reselection metric satisfies a selection condition. It is to be understood that block(s) of the method 400 may be rearranged, combined, or omitted in certain configurations. The method 400 illustrates blocks to perform ePDG reselection in the circumstances where the UE 110 selects an ePDG based on the UE's attached PLMN over 3GPP access.

In some aspects, the ePDG reselection procedure illustrated in the method 400 may be extended to the case when the UE 110 has statically configured with more than one ePDG FQDN in a priority order. The reselection of ePDG may be based on the FQDNs configured at the UE 110, and is independent of the PLMN that the UE 110 has attached to via 3GPP.

The method 400-a of FIG. 4A provides an example method for supporting ePDG reselection after the UE 110 has successfully selected an ePDG in a VPLMN. If the UE 110 encounters certain failures while attempting to establish a PDN connection via the ePDG and if the failure results in all of the ePDGs in this PLMN being blocked for all APNs (or for certain APNs, as configurable on the UE 110), the UE 110 may reselect to an ePDG in the HPLMN, if permitted by the HPLMN. Once the UE 110 has reselected to the HPLMN ePDG and while still attached to the VPLMN, if the UE 110 detects that the ePDG(s) in the VPLMN become un-blocked, the UE 110 may determine that discovery and selection of a different ePDG may be appropriate.

For example, at block 402 the method 400-a may include the UE 110 selecting an ePDG of a VPLMN. At block 404, the UE 110 may determine if a PDN connection failure has occurred. If no PDN connection failure has been detected, at 406 the UE 110 may communicate via the VPLMN ePDG. If a PDN connection failure has been detected, at 408 the UE 110 may determine if any or all of the ePDGs of the VPLMN are blocked. If no ePDGs of the VPLMN are blocked, the UE 110 may communicate via a VPLMN ePDG. If the VPLMN ePDGs are blocked and if the UE 110 is allowed to do so, at 410 the UE 110 may reselect to the HPLMN ePDG. If one, or more than one of the ePDGs of the VPLMN are not blocked, the UE 110 may determine whether selection of an unblocked ePDG is appropriate.

At 412, the UE 110 may determine whether one of the ePDGs of the VPLMN have become unblocked. If not, at 414 the UE 110 may continue to communicate via the HPLMN ePDG. If yes, at 416 the UE 110 may determine evaluate the ePDG reselection metric to determine whether reselection to an unblocked ePDG is appropriate.

Referring next to FIG. 4B, the method 400-b provides an example method that supports ePDG reselection after the UE 110 has successfully selected an ePDG. If the UE 110 continuously monitors the conditions (for example if the UE 110 fails in connecting to a given APN over the selected ePDG, or if a change of PLMN over 3GPP access occurs) listed in the EPDGReselEvlCondList, when configured at the UE 110. If the condition(s) in the EPDGReselEvlCondList are satisfied or when the list is empty, the UE 110 may start periodically re-evaluating the ePDG selection metric. For example, the UE 110 may determine whether a change of PLMN over 3GPP access has occurred (which may include the scenario where the attached PLMN has changed from one PLMN to a different PLMN, and when the UE 110 has changed between "no PLMN" and "attached to a PLMN"), or whether the current 3GPP cell identify (such as a tracking area identity/location area identity) has changed. The UE 110 may determine whether discover and reselection of a different ePDG is appropriate. In the circumstances where the condition(s) in the list are not satisfied, the UE 110 may continue to monitor the condition(s) in the list.

For example, at block 418 the method 400-b may include the UE 110 selecting an ePDG. At block 420, the UE 110 may determine if a reselection condition(s) in the list are satisfied. If not, the UE 110 may return to block 420 and continue to monitor the reselection conditions. If the reselection condition is satisfied (or the condition list is empty), at block 422, the UE 110 may evaluate or monitor the ePDG selection metric. At block 424, the UE 110 may determine whether the selection metrics have changed (e.g., based on evaluating/monitoring the ePDG selection metric in block 422). If the selection metrics have not changed, the UE 110 may return to block 420 and continue to monitor the reselection conditions and/or the ePDG selection metric. If the reselection condition is satisfied and the selection metrics have changed, at block 426 the UE 110 may determine whether there are any ongoing restricted services for which ePDG reselection may not be performed (for example including but not limited to real time services, restricted traffic types, etc.). The UE 110 may be configured (such as by the HPLMN, the user, or other sources) with a list of restricted services or restricted traffic types for which ePDG reselection may not be performed for as long as the services or traffic types are active. If there are ongoing restricted services, the UE 110 returns to block 420 and continues to monitor the conditions. If there are no active forbidden traffic types ongoing, at block 428 the UE 110 may construct an ePDG FQDN and perform DNS query to discover and reselect to a different ePDG.

At block 430, if the ePDG IP address that the UE 110 is currently connecting to is contained in the IP address(es) that the UE 110 obtains through DNS resolution, the ePDG reselection may be terminated and the UE 110 returns to block 420 and continues to monitor the conditions. If the ePDG IP address that the UE 110 is currently connecting to (such as the source ePDG) is not contained in the IP address(es) that the UE 110 obtains through DNS resolution, the UE 110 may determine to reselect to a different ePDG.

Referring next to FIG. 4C, the method 400-c provides an example method that supports ePDG reselection when the UE 110 has determined that selection of a different ePDG is appropriate. In this example, if PLMN change is between HPLMN and VPLMN, the UE 110 may release the existing PDN connections on the source ePDG that correspond to the APNs included in the NoRoamingAPNList. The UE 110 also may perform two steps of handover of all other PDNs. In particular, the UE 110 may initiate handover of all other PDNs from the source ePDG to 3GPP, followed by handover of the PDNs from 3GPP to the new ePDG based on the RAT preference rule. For example, at block 440 the method 400-c may include the UE 110 determining to reselect a different ePDG. At block 442, the UE 110 determines if reselecting to a different ePDG involves a change from a HPLMN ePDG to a VPLMN ePDG. If reselecting to a different ePDG involves a change from a HPLMN ePDG to a VPLMN ePDG, the UE may release PDN connections that are not allowed to roam. For example, the UE 110 may obtain a list of non-roaming APNs, such as a NoRoamingAPNList, which may be used to identify APN(s) associated with one or more PDN connections to be released when the UE 110 determines to reselect from a HPLMN ePDG to a VPLMN ePDG. In other words, when the UE 110 determines that a different ePDG may be selected, if the PLMN change is between HPLMN to VPLMN, the UE 110 may release the existing PDN connection on the source ePDG if the corresponding APN is included in the non-roaming APN list. After releasing the PDN connections or if it is determined that the ePDG reselection is not from a HPLMN ePDG to a VPLMN ePDG, the UE may perform a two-step handover process that involves handing over the remaining PDN connections to a 3GPP RAT at block 446 followed by handing over the PDNs from the 3GPP RAT to the new ePDG at block 448.

Figure 5:
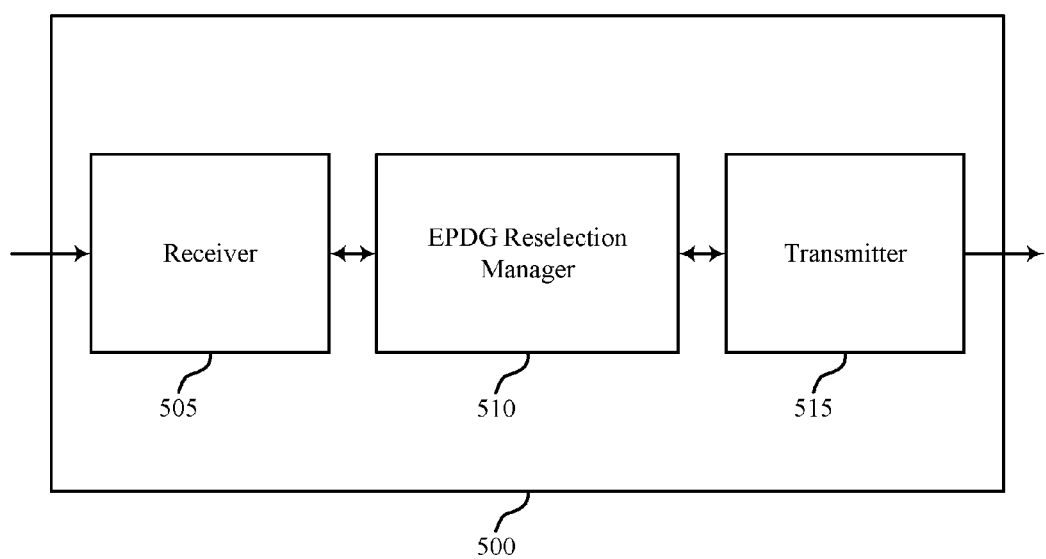
FIGS. 5-7 show block diagrams of an example device.

FIG. 5 shows a block diagram of an example device such as a wireless device 500. The wireless device 500 may support ePDG reselection in accordance with various aspects of the present disclosure. The wireless device 500 may be an example of aspects of a UE 110 described with reference to FIGS. 1 and 2. The wireless device 500 may implement aspects of the method 400 described with reference to FIGS. 4A to 4D. The wireless device 500 may include the receiver 505, the ePDG reselection manager 510 and transmitter 515. The wireless device 500 also may include a processor. Each of these components may be in communication with each other.

The receiver 505 may receive information such as packets, user data, or control information associated with various information channels (such as control channels, data channels, and information related to evolved packet data gateway reselection, etc.). Information may be passed on to other components of the device. The receiver 505 may be an example of aspects of the transceiver 825 described with reference to FIG. 8.

The ePDG reselection manager 510 may evaluate an ePDG reselection metric associated with the first ePDG, and reselect a second ePDG based at least in part on the ePDG reselection metric satisfying selection condition(s). The ePDG reselection manager 510 also may be an example of aspects of the ePDG reselection manager 805 described with reference to FIG. 8.

The transmitter 515 may transmit signals received from other components of the wireless device 500. In some examples, the transmitter 515 may be collocated with a receiver in a transceiver module. For example, the transmitter 515 may be an example of aspects of the transceiver 825 described with reference to FIG. 8. The transmitter 515 may include a single antenna, or it may include a plurality of antennas.

Figure 6:
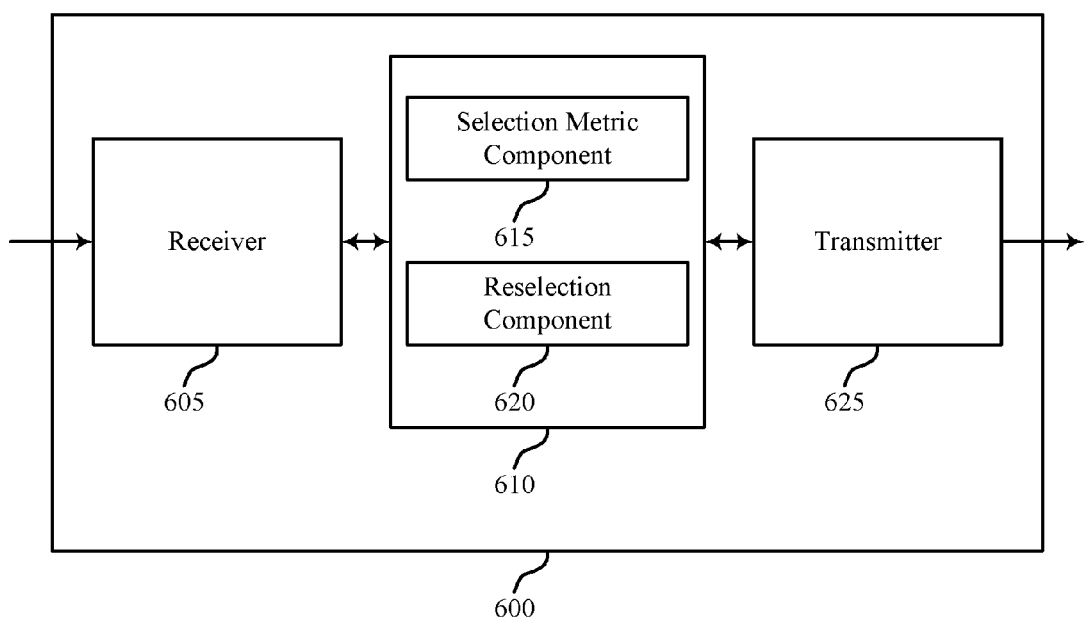

FIG. 6 shows a block diagram of an example device such as a wireless device 600. The wireless device 600 can support ePDG reselection in accordance with various aspects of the present disclosure. The wireless device 600 may be an example of aspects of a wireless device 500 or a UE 110 described with reference to FIGS. 1, 2, and 5. The wireless device 600 may implement aspects of method 400 described with reference to FIGS. 4A to 4D. The wireless device 600 may include a receiver 605, an ePDG reselection manager 610 and a transmitter 625. The wireless device 600 also may include a processor. Each of these components may be in communication with each other.

The receiver 605 may receive information which may be passed on to other components of the device. The receiver 605 also may perform the functions described with reference to the receiver 505 of FIG. 5. The receiver 605 may be an example of aspects of the transceiver 825 described with reference to FIG. 8.

The ePDG reselection manager 610 may be an example of aspects of an ePDG reselection manager 510 described with reference to FIG. 5. The ePDG reselection manager 610 may include the selection metric component 615 and the reselection component 620. The ePDG reselection manager 610 may be an example of aspects of the ePDG reselection manager 805 described with reference to FIG. 8.

The selection metric component 615 may evaluate the ePDG reselection metric base at least in part on the ePDGs being unblocked, refrain from evaluating the ePDG reselection metric while the at least one condition parameter is unsatisfied, identify a change in the ePDG reselection metric, evaluate the ePDG reselection metric according to a periodic schedule, evaluate the ePDG reselection metric based at least in part on a triggering event, and evaluate an ePDG reselection metric associated with the first ePDG. In some cases, the ePDG reselection metric is associated with at least one of a current PLMN detected by the UE 110, a current geographical location of the UE 110, or a current cell identity detected by the UE 110, or combinations thereof.

The reselection component 620 may reselect the second ePDG based at least in part on an identifier associated with the first ePDG being absent from a results of the DNS query, reselect the second ePDG, refrain from reselecting the second ePDG based at least in part on the operational status, and reselect a second ePDG based at least in part on the ePDG reselection metric satisfying selection condition(s). In some cases, the first ePDG is associated with a first PLMN and the second ePDG is associated with a second PLMN. In some cases, reselecting to the second ePDG includes reselecting to the second ePDG of a second PLMN.

The transmitter 625 may transmit signals received from other components of the wireless device 600. In some examples, the transmitter 625 may be collocated with a receiver in a transceiver module. For example, the transmitter 625 may be an example of aspects of the transceiver 825 described with reference to FIG. 8. The transmitter 625 may utilize a single antenna, or it may utilize a plurality of antennas.

Figure 7:
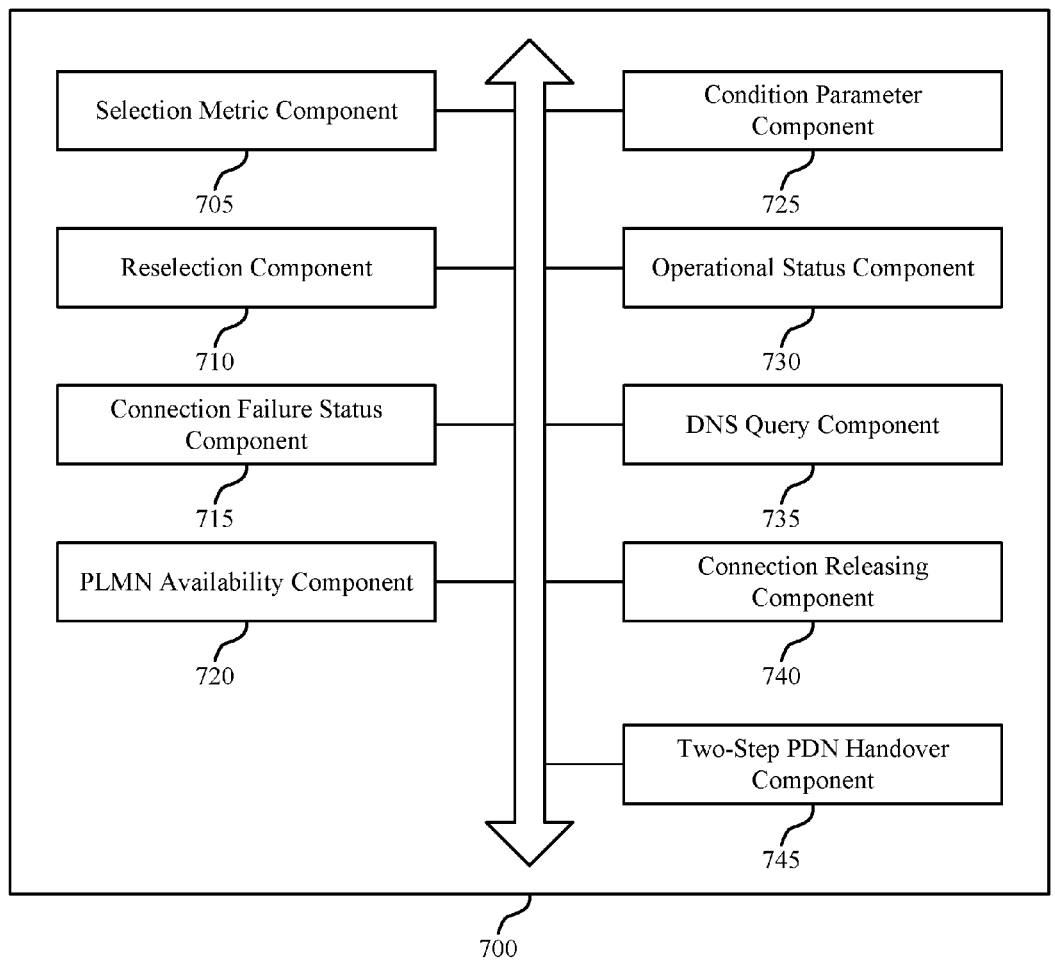

FIG. 7 shows a block diagram of an ePDG reselection manager 700 which may be an example of the corresponding component of a wireless device 500 or a wireless device 600. That is, the ePDG reselection manager 700 may be an example of aspects of an ePDG reselection manager 510 or an ePDG reselection manager 610 described with reference to FIGS. 5 and 6, respectively. The ePDG reselection manager 700 also may be an example of aspects of the ePDG reselection manager 805 described with reference to FIG. 8.

The ePDG reselection manager 700 may include a selection metric component 705, a reselection component 710, a connection failure status component 715, a PLMN availability component 720, a condition parameter component 725, an operational status component 730, a DNS query component 735 and a connection releasing component 740. Each of these modules may communicate, directly or indirectly, with one another (for example via bus(es)).

The selection metric component 705 may evaluate the ePDG reselection metric base at least in part on the ePDGs being unblocked, refrain from evaluating the ePDG reselection metric while the at least one condition parameter is unsatisfied, identify a change in the ePDG reselection metric, evaluate the ePDG reselection metric according to a periodic schedule, evaluate the ePDG reselection metric based at least in part on a triggering event, and evaluate an ePDG reselection metric associated with the first ePDG. In some cases, the ePDG reselection metric is associated with at least one of current PLMN detected by the UE 110, or a current geographical location of the UE 110, or a current cell identity detected by the UE 110, or combinations thereof.

The reselection component 710 may reselect the second ePDG based at least in part on an identifier associated with the first ePDG being absent from a results of the DNS query, reselect the second ePDG, refrain from reselecting the second ePDG based at least in part on the operational status, and reselect a second ePDG based at least in part on the ePDG reselection metric satisfying selection condition(s). In some cases, the first ePDG is associated with a first PLMN and the second ePDG is associated with a second PLMN. In some cases, reselecting to the second ePDG includes reselecting to the second ePDG of a second PLMN.

The connection failure status component 715 may identify a connection failure status associated with a PDN gateway.

The PLMN availability component 720 may determine that the at least portion of ePDGs associated with a first PLMN become un-blocked, and determine at least one of that at least a portion of ePDGs associated with a first PLMN are blocked or that connection attempts to ePDGs of the first PLMN that are not blocked have failed.

The condition parameter component 725 may identify at least one condition parameter associated with the ePDG reselection evaluation, determine that the at least one condition parameter is unsatisfied, and determine that the at least one condition parameter is satisfied. In some cases, the at least one condition parameter includes at least one of a change of a PLMN of a cellular RAT, or a PDNconnection status failure via the first ePDG, or combinations thereof.

The operational status component 730 may identify an inactive operational status of the UE 110, and identify an active operational status of the UE 110. In some cases, the active operational status is associated with a traffic type associated with UE 110 communications. In some cases, the active operational status is associated with an application operating on the UE 110.

The DNS query component 735 may perform a DNS query based on at least one of the changed ePDG reselection metric or an ePDG FQDN configured at the UE 110.

The connection releasing component 740 may release a connection to a PDN via the first ePDG, the releasing based at least in part on the PDN being associated with a non-roaming access list.

The two-step PDN handover component 745 may perform two step of PDN handovers. In particular, the two-step PDN handover component 745 may initiate handover of all other PDNs from the source ePDG to 3GPP, followed by handover of the PDNs from 3GPP to the new ePDG based on the RAT preference rule.

Figure 8:
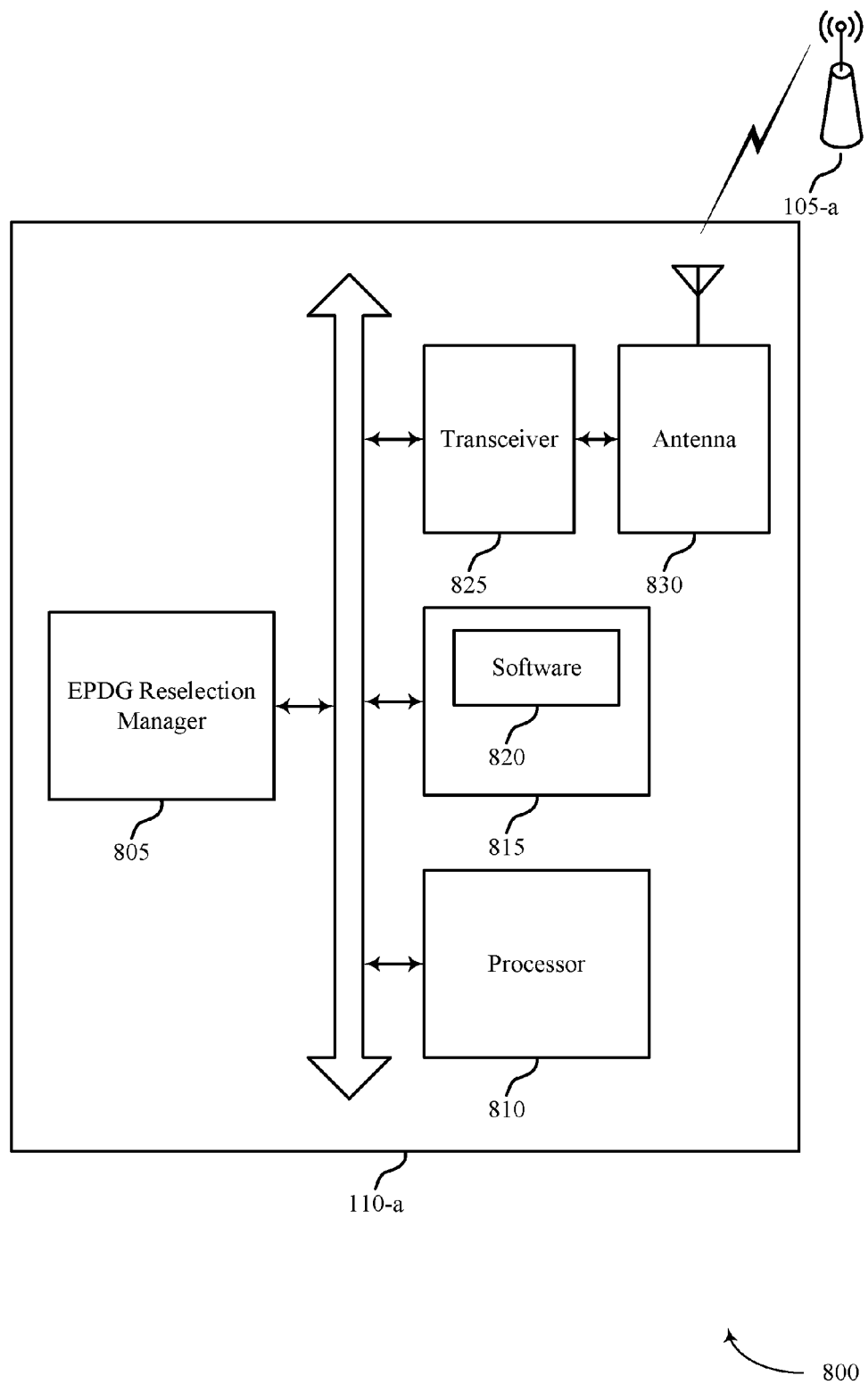
FIG. 8 shows a block diagram of an example system including a device.

FIG. 8 shows a diagram of a system 800 including a device that supports evolved packet data gateway reselection in accordance with various aspects of the present disclosure. For example, system 800 may include UE 110-a, which may be an example of a wireless device 500, a wireless device 600, or a UE 110 as described with reference to FIGS. 1,2, and 5-7. UE 110-a also may include an ePDG reselection manager 805, a processor 810, a memory 815, a transceiver 825, and an antenna 830. Each of these modules may communicate, directly or indirectly, with one another (for example via bus(es)).

The ePDG reselection manager 805 may be an example of an ePDG reselection manager as described with reference to FIGS. 5-7. The processor 810 may include an intelligent hardware device, (such as a central processing unit (CPU), a microcontroller, an application specific integrated circuit (ASIC), etc.)

The memory 815 may include random access memory (RAM) and read only memory (ROM). The memory 815 may store computer-readable, computer-executable software including instructions that, when executed, cause the processor to perform various functions described herein (such as evolved packet data gateway reselection, etc.). In some cases, the software 820 may not be directly executable by the processor but may cause a computer (for example when compiled and executed) to perform functions described herein.

The transceiver 825 may communicate bi-directionally, via antennas, wired, or wireless links, with network(s), as described above. For example, the transceiver 825 may communicate bi-directionally with an AP 105-a or a UE 110. The transceiver 825 also may include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

Figure 9:
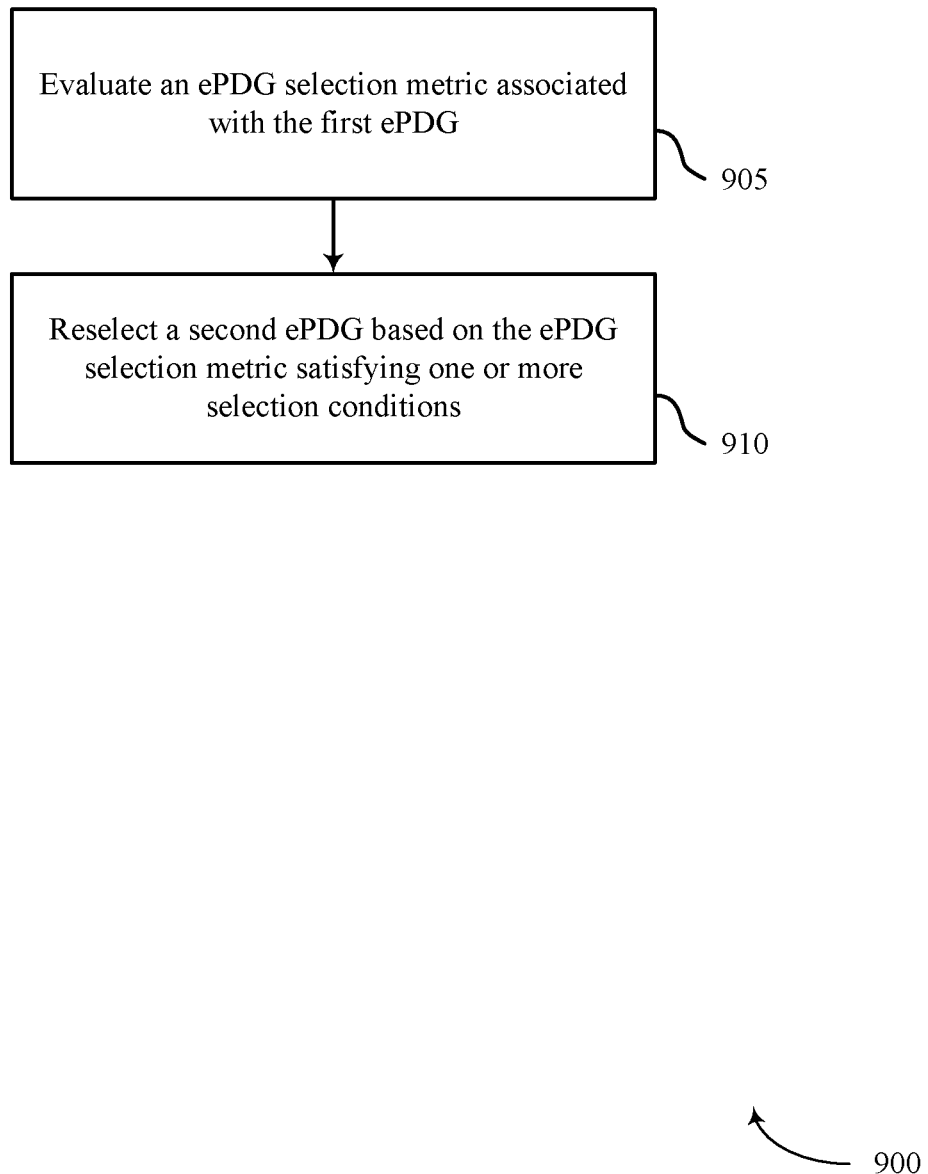
FIGS. 9-14 show example flowcharts for ePDG reselection.

FIG. 9 shows a flowchart illustrating a method 900 for evolved packet data gateway reselection in accordance with various aspects of the present disclosure. The operations of the method 900 may be implemented by a UE 110 or its components as described with reference to FIGS. 1 and 2. For example, the operations of the method 900 may be performed by the ePDG reselection manager as described herein. In some examples, the UE 110 may execute a set of codes to control the functional elements of the device to perform the functions described below. Additionally or alternatively, the UE 110 may perform aspects of the functions described below using special-purpose hardware.

At block 905, the UE 110 may evaluate an ePDG selection metric associated with the first ePDG as described above with reference to FIGS. 2-4D. In some implementations, the operations of block 905 may be performed by the selection metric component as described with reference to FIGS. 6 and 7.

At block 910, the UE 110 may reselect a second ePDG based on the ePDG reselection metric satisfying selection condition(s) as described above with reference to FIGS. 2-4D. In some implementations, the operations of block 910 may be performed by the reselection component as described with reference to FIGS. 6 and 7.

Figure 10:
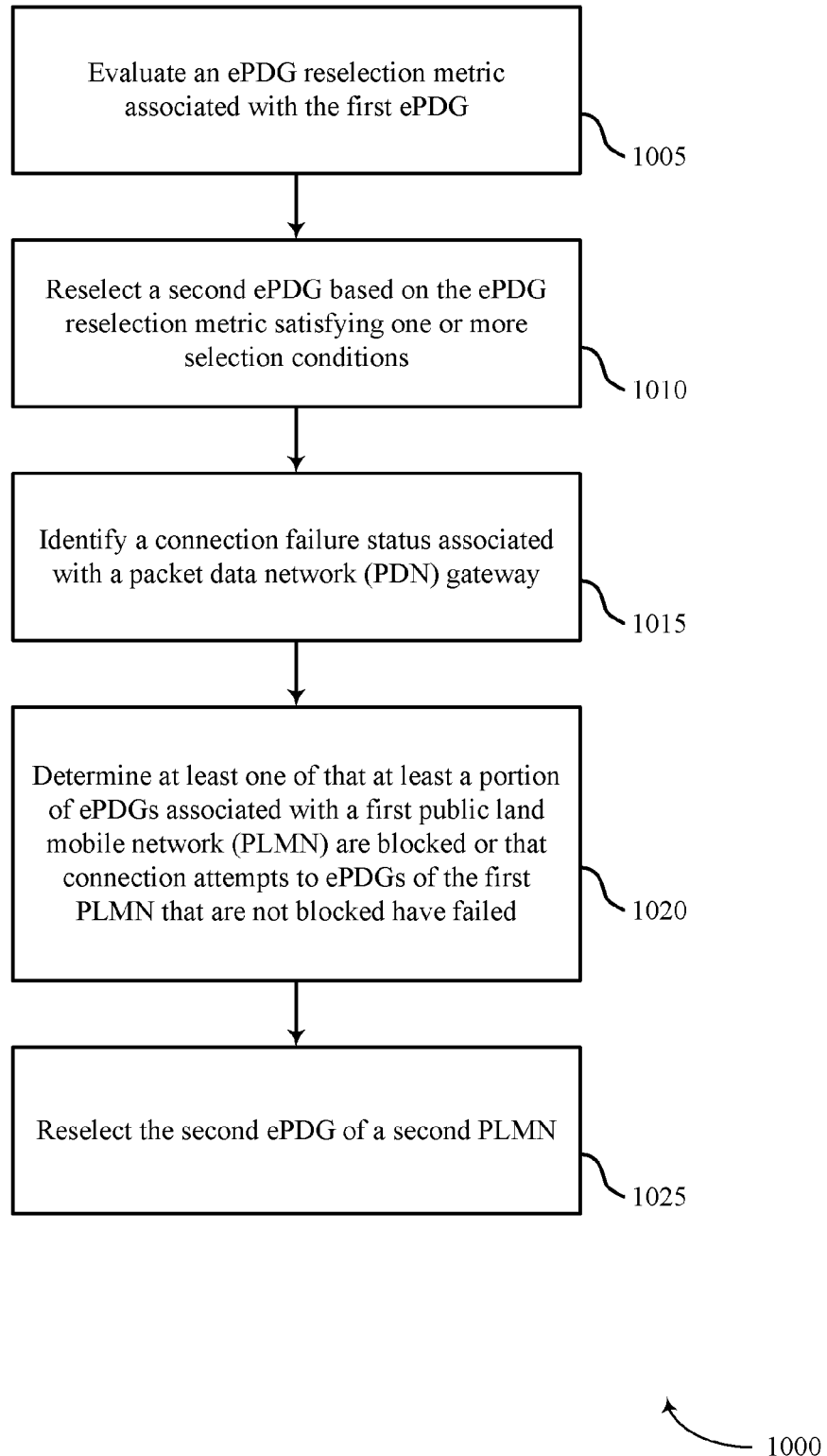

FIG. 10 shows a flowchart illustrating a method 1000 for evolved packet data gateway reselection in accordance with various aspects of the present disclosure. The operations of method 1000 may be implemented by a UE 110 or its components as described with reference to FIGS. 1 and 2. For example, the operations of method 1000 may be performed by the ePDG reselection manager as described herein. In some examples, the UE 110 may execute a set of codes to control the functional elements of the device to perform the functions described below. Additionally or alternatively, the UE 110 may perform aspects the functions described below using special-purpose hardware.

At block 1005, the UE 110 may evaluate an ePDG reselection metric associated with the first ePDG as described above with reference to FIGS. 2-4D. In some implementations, the operations of block 1005 may be performed by the selection metric component as described with reference to FIGS. 6 and 7.

At block 1010, the UE 110 may reselect a second ePDG based on the ePDG reselection metric satisfying selection condition(s) as described above with reference to FIGS. 2-4D. In some implementations, the operations of block 1010 may be performed by the reselection component as described with reference to FIGS. 6 and 7.

At block 1015, the UE 110 may identify a connection failure status associated with a PDN gateway as described above with reference to FIGS. 2-4D. In some implementations, the operations of block 1015 may be performed by the connection failure status component as described with reference to FIGS. 6 and 7.

At block 1020, the UE 110 may determine that at least a portion of ePDGs associated with a first PLMN are blocked or that connection attempts to ePDGs of the first PLMN that are not blocked have failed as described above with reference to FIGS. 2-4D. In some implementations, the operations of block 1020 may be performed by the PLMN availability component as described with reference to FIGS. 6 and 7.

At block 1025, the UE 110 may reselect the second ePDG of a second PLMN as described above with reference to FIGS. 2-4D. In some implementations, the operations of block 1025 may be performed by the reselection component as described with reference to FIGS. 6 and 7.

Figure 11:
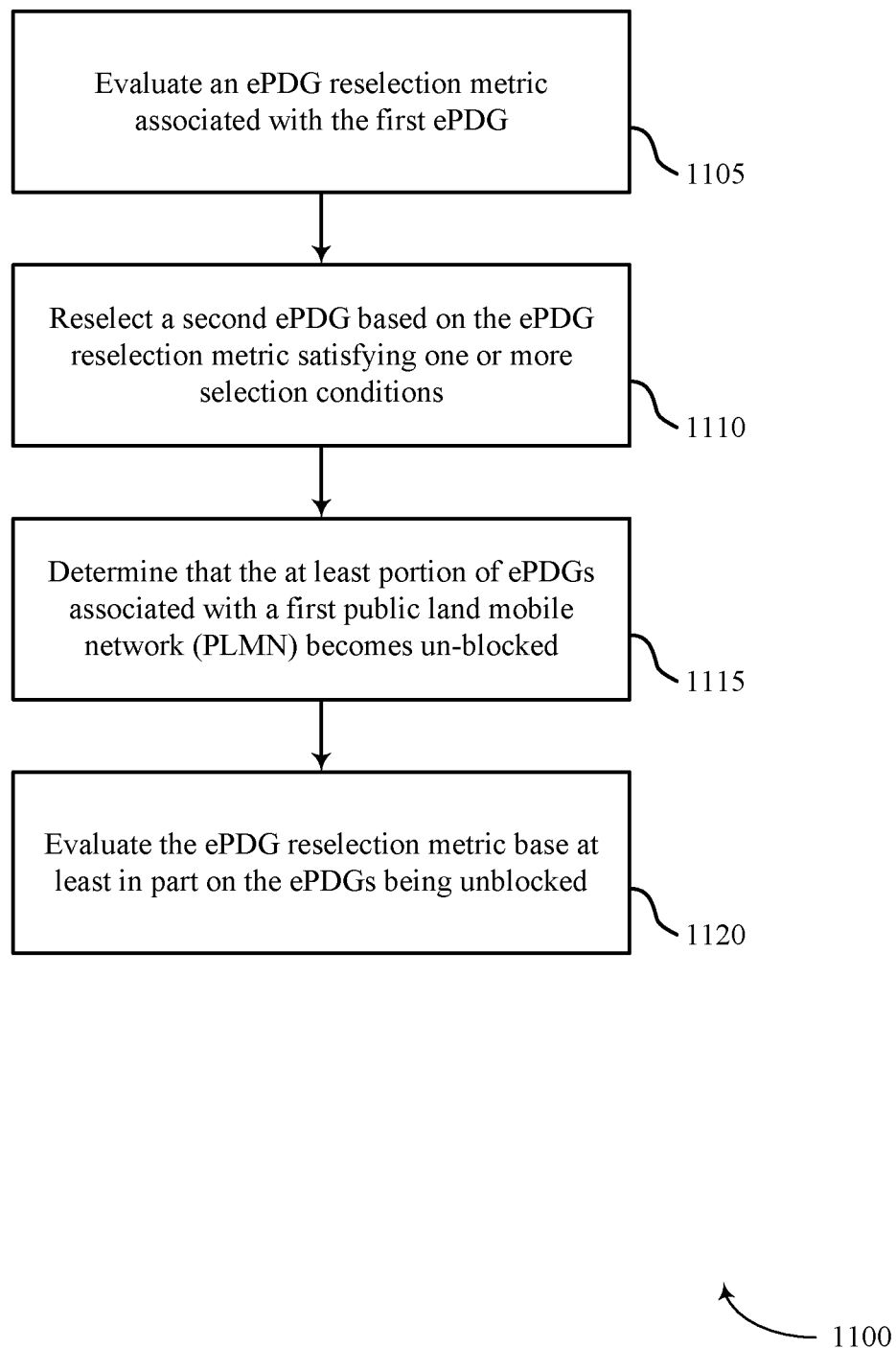

FIG. 11 shows a flowchart illustrating a method 1100 for ePDG reselection. The operations of method 1100 may be implemented by a UE 110 or its components as described with reference to FIGS. 1 and 2. For example, the operations of the method 1100 may be performed by the ePDG reselection manager as described herein. In some examples, the UE 110 may execute a set of codes to control the functional elements of the device to perform the functions described below. Additionally or alternatively, the UE 110 may perform aspects the functions described below using special-purpose hardware.

At block 1105, the UE 110 may evaluate an ePDG reselection metric associated with the first ePDG as described above with reference to FIGS. 2-4D. In some implementations, the operations of block 1105 may be performed by the selection metric component as described with reference to FIGS. 6 and 7.

At block 1110, the UE 110 may reselect a second ePDG based on the ePDG reselection metric satisfying selection condition(s) as described above with reference to FIGS. 2-4D. In some implementations, the operations of block 1110 may be performed by the reselection component as described with reference to FIGS. 6 and 7.

At block 1115, the UE 110 may determine that the at least a portion of ePDGs associated with a first PLMN becomes un-blocked as described above with reference to FIGS. 2-4D. In some implementations, the operations of block 1115 may be performed by the PLMN availability component as described with reference to FIGS. 6 and 7.

At block 1120, the UE 110 may evaluate the ePDG reselection metric based at least in part on the ePDGs being unblocked as described above with reference to FIGS. 2-4D. In some implementations, the operations of block 1120 may be performed by the selection metric component as described with reference to FIGS. 6 and 7.

Figure 12:
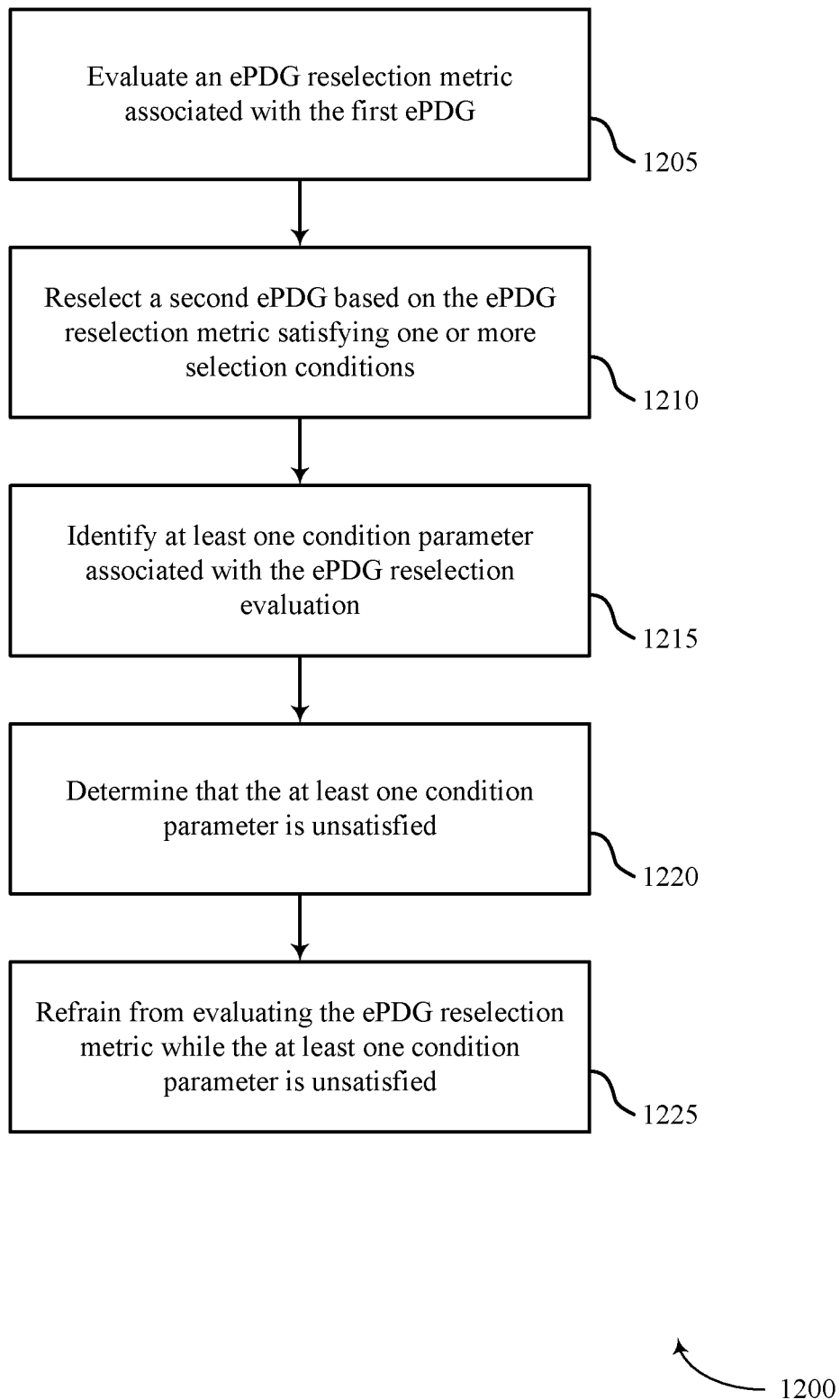

FIG. 12 shows a flowchart illustrating a method 1200 for ePDG reselection. The operations of the method 1200 may be implemented by a UE 110 or its components as described with reference to FIGS. 1 and 2. For example, the operations of the method 1200 may be performed by the ePDG reselection manager as described herein. In some examples, the UE 110 may execute a set of codes to control the functional elements of the device to perform the functions described below. Additionally or alternatively, the UE 110 may perform aspects the functions described below using special-purpose hardware.

At block 1205, the UE 110 may evaluate an ePDG reselection metric associated with the first ePDG as described above with reference to FIGS. 2-4D. In some implementations, the operations of block 1205 may be performed by the selection metric component as described with reference to FIGS. 6 and 7.

At block 1210, the UE 110 may reselect a second ePDG based on the ePDG reselection metric satisfying selection condition(s) as described above with reference to FIGS. 2-4D. In some implementations, the operations of block 1210 may be performed by the reselection component as described with reference to FIGS. 6 and 7.

At block 1215, the UE 110 may identify at least one condition parameter associated with the ePDG reselection evaluation as described above with reference to FIGS. 2-4D. In some implementations, the operations of block 1215 may be performed by the condition parameter component as described with reference to FIGS. 6 and 7.

At block 1220, the UE 110 may determine that the at least one condition parameter is unsatisfied as described above with reference to FIGS. 2-4D. In some implementations, the operations of block 1220 may be performed by the condition parameter component as described with reference to FIGS. 6 and 7.

At block 1225, the UE 110 may refrain from evaluating the ePDG reselection metric while the at least one condition parameter is unsatisfied as described above with reference to FIGS. 2-4D. In some implementations, the operations of block 1225 may be performed by the selection metric component as described with reference to FIGS. 6 and 7.

Figure 13:
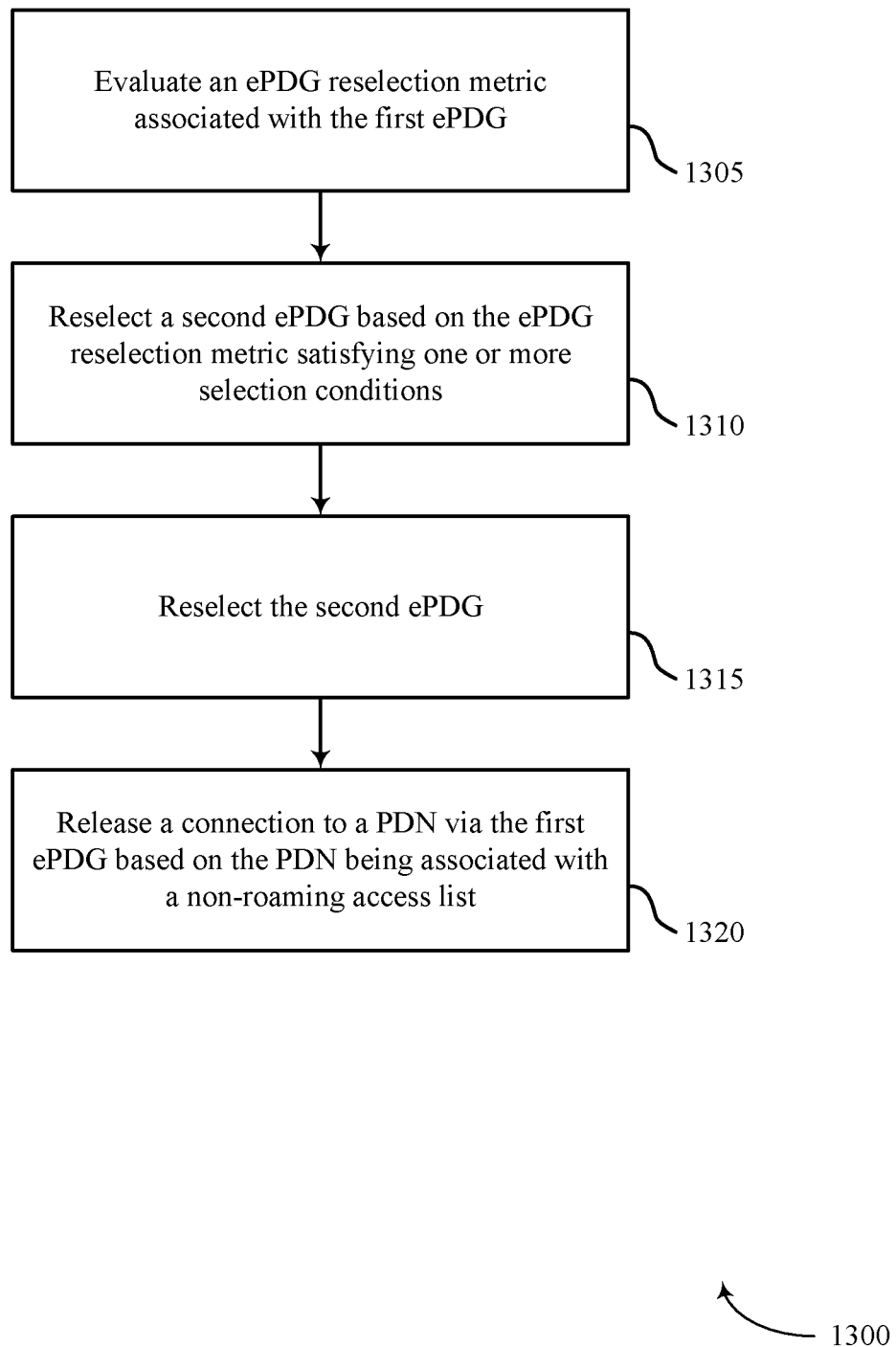

FIG. 13 shows a flowchart illustrating a method 1300 for evolved packet data gateway reselection in accordance with various aspects of the present disclosure. The operations of method 1300 may be implemented by a UE 110 or its components as described with reference to FIGS. 1 and 2. For example, the operations of method 1300 may be performed by the ePDG reselection manager as described herein. In some examples, the UE 110 may execute a set of codes to control the functional elements of the device to perform the functions described below. Additionally or alternatively, the UE 110 may perform aspects the functions described below using special-purpose hardware.

At block 1305, the UE 110 may evaluate an ePDG reselection metric associated with the first ePDG as described above with reference to FIGS. 2-4D. In some implementations, the operations of block 1305 may be performed by the selection metric component as described with reference to FIGS. 6 and 7.

At block 1310, the UE 110 may reselect a second ePDG based on the ePDG reselection metric satisfying selection condition(s) as described above with reference to FIGS. 2-4D. In some implementations, the operations of block 1310 may be performed by the reselection component as described with reference to FIGS. 6 and 7.

At block 1315, the UE 110 may reselect the second ePDG as described above with reference to FIGS. 2-4D. In some implementations, the operations of block 1315 may be performed by the reselection component as described with reference to FIGS. 6 and 7.

At block 1320, the UE 110 may release a connection to a PDN via the first ePDG, the releasing based on the PDN being associated with a non-roaming access list as described above with reference to FIGS. 2-4D. In some implementations, the operations of block 1320 may be performed by the connection releasing component as described with reference to FIGS. 6 and 7.

Figure 14:
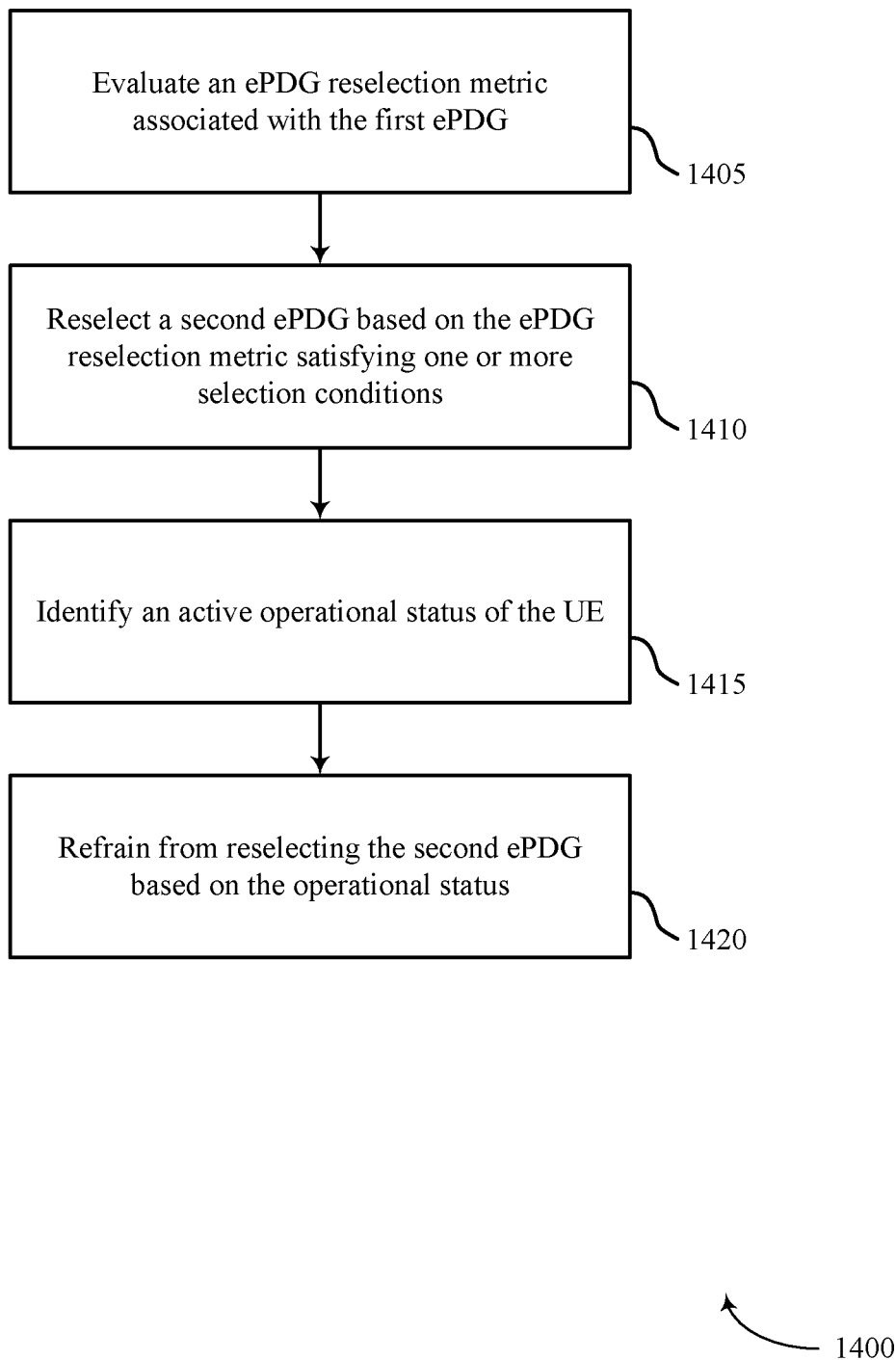

FIG. 14 shows a flowchart illustrating a method 1400 for ePDG reselection. The operations of method 1400 may be implemented by a UE 110 or its components as described with reference to FIGS. 1 and 2. For example, the operations of method 1400 may be performed by the ePDG reselection manager as described herein. In some examples, the UE 110 may execute a set of codes to control the functional elements of the device to perform the functions described below. Additionally or alternatively, the UE 110 may perform aspects the functions described below using special-purpose hardware.

At block 1405, the UE 110 may evaluate an ePDG reselection metric associated with the first ePDG as described above with reference to FIGS. 2-4D. In some implementations, the operations of block 1405 may be performed by the selection metric component as described with reference to FIGS. 6 and 7.

At block 1410, the UE 110 may reselect a second ePDG based on the ePDG reselection metric satisfying selection condition(s) as described above with reference to FIGS. 2-4D. In some implementations, the operations of block 1410 may be performed by the reselection component as described with reference to FIGS. 6 and 7.

At block 1415, the UE 110 may identify an active operational status of the UE as described above with reference to FIGS. 2-4D. In some implementations, the operations of block 1415 may be performed by the operational status component as described with reference to FIGS. 6 and 7.

At block 1420, the UE 110 may refrain from reselecting the second ePDG based on the operational status as described above with reference to FIGS. 2-4D. In some implementations, the operations of block 1420 may be performed by the reselection component as described with reference to FIGS. 6 and 7.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a DSP, an ASIC, an FPGA or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, multiple microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, electrically erasable programmable read only memory (EEPROM), compact disc (CD)-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes CD, laser disc, optical disc, digital versatile disc (DVD), floppy disk, and blu-ray disc where disks usually reproduce data magnetically, while discs reproduce data optically with lasers. Combinations of the above are included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to a person/one having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person/one having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this is not understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above is not understood as requiring such separation in all implementations, and it is understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication, comprising:
connecting, by a user equipment (UE), to a first evolved packet data gateway (ePDG) via a first radio access technology (RAT), the first ePDG associated with and separate from a packet data network (PDN) gateway;
identifying, by the UE, a connection failure status associated with the PDN gateway;
determining, by the UE, that at least a portion of ePDGs associated with a first public land mobile network (PLMN) are blocked, or that connection attempts to ePDGs of the first PLMN that are not blocked have failed, or combinations of both;
evaluating, by the UE, an ePDG reselection metric associated with the first ePDG; and
reselecting, by the UE, a second ePDG based at least in part on the ePDG reselection metric satisfying one or more selection conditions, wherein the second ePDG is associated with a second PLMN.

2. The method of claim 1, further comprising:
determining that the at least portion of ePDGs associated with the first PLMN becomes un-blocked; and
evaluating the ePDG reselection metric base at least in part on the portion of the ePDGs being unblocked.

3. The method of claim 1, further comprising:
identifying at least one condition parameter associated with the ePDG reselection metric; and
determining that the at least one condition parameter is unsatisfied.

4. The method of claim 3, further comprising:
refraining from evaluating the ePDG reselection metric while the at least one condition parameter is unsatisfied.

5. The method of claim 3, wherein the at least one condition parameter comprises a change of a public land mobile network (PLMN) of a cellular RAT, or a PDN connection status failure via the first ePDG, or combinations thereof.

6. The method of claim 3, further comprising:
determining that the at least one condition parameter is satisfied;
identifying an inactive operational status of the UE;
identifying a change in the ePDG reselection metric; and
performing a domain name system (DNS) query based on at least one of the changed ePDG reselection metric or an ePDG fully qualified domain name (FQDN) configured at the UE, wherein reselecting the second ePDG is further based on an identifier associated with the first ePDG being absent from a results of the DNS query.

7. The method of claim 1, further comprising:
releasing a connection to the PDN via the first ePDG, the releasing based at least in part on the PDN being associated with a non-roaming access list.

8. The method of claim 7, wherein the first ePDG is associated with the first PLMN and the second ePDG is associated with the second PLMN.

9. The method of claim 1, further comprising:
identifying an active operational status of the UE.

10. The method of claim 9, wherein the active operational status is associated with a restricted service associated with UE communications.

11. The method of claim 9, wherein the active operational status is associated with an application operating on the UE.

12. The method of claim 1, wherein the ePDG reselection metric is associated with at least one of current public land mobile network (PLMN) detected by the UE, or a current geographical location of the UE, or a current cell identity detected by the UE, or combinations thereof.

13. The method of claim 1, further comprising:
evaluating the ePDG reselection metric according to a periodic schedule.

14. The method of claim 1, further comprising:
evaluating the ePDG reselection metric based at least in part on a triggering event.

15. An apparatus for wireless communication, in a system comprising:
a processor;
memory in electronic communication with the processor; and
instructions stored in the memory and operable, when executed by the processor, to cause the apparatus to:
connect, by a user equipment (UE), to a first evolved packet data gateway (ePDG) via a first radio access technology (RAT), the first ePDG associated with and separate from a packet data network (PDN) gateway;
identify, by the UE, a connection failure status associated with the PDN gateway;
determine, by the UE, that at least a portion of ePDGs associated with a first public land mobile network (PLMN) are blocked, or that connection attempts to ePDGs of the first PLMN that are not blocked have failed, or combinations of both;
evaluate, by the UE, an ePDG reselection metric associated with the first ePDG; and
reselect, by the UE, a second ePDG based at least in part on the ePDG reselection metric satisfying one or more selection conditions, wherein the second ePDG is associated with a second PLMN.

16. The apparatus of claim 15, wherein the instructions are further executable by the processor to:
determine that the at least portion of ePDGs associated with the first PLMN becomes un-blocked; and
evaluate the ePDG reselection metric base at least in part on the portion of the ePDGs being unblocked.

17. The apparatus of claim 15, wherein the instructions are further executable by the processor to:
identify at least one condition parameter associated with the ePDG reselection metric; and
determine that the at least one condition parameter is unsatisfied.

18. The apparatus of claim 17, wherein the instructions are further executable by the processor to:
refrain from evaluating the ePDG reselection metric while the at least one condition parameter is unsatisfied.

19. A non-transitory computer-readable medium storing code for wireless communication, the code comprising instructions executable by a processor to:
- connect, by a user equipment (UE), to a first evolved packet data gateway (ePDG) via a first radio access technology (RAT), the first ePDG associated with and separate from a packet data network (PDN) gateway;
- identify, by the UE, a connection failure status associated with the PDN gateway; and
- determine, by the UE, that at least a portion of ePDGs associated with a first public land mobile network (PLMN) are blocked, or that connection attempts to ePDGs of the first PLMN that are not blocked have failed, or combinations of both;
- evaluate, by the UE, an ePDG reselection metric associated with the first ePDG; and
- reselect, by the UE, a second ePDG based at least in part on the ePDG reselection metric satisfying one or more selection conditions, wherein the second ePDG is associated with a second PLMN.

* * * * *